(12) United States Patent
Uno

(10) Patent No.: US 11,899,697 B2
(45) Date of Patent: Feb. 13, 2024

(54) INFORMATION PROCESSING SERVER, PROCESSING METHOD FOR INFORMATION PROCESSING SERVER, AND NON-TRANSITORY STORAGE MEDIUM

(71) Applicant: TOYOTA JIDOSHA KABUSHIKI KAISHA, Toyota (JP)

(72) Inventor: Satoshi Uno, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 17/742,783

(22) Filed: May 12, 2022

(65) Prior Publication Data

US 2022/0391423 A1     Dec. 8, 2022

(30) Foreign Application Priority Data

Jun. 4, 2021  (JP) .................................. 2021-094351

(51) Int. Cl.
*G06F 16/29* (2019.01)
*B60W 60/00* (2020.01)

(52) U.S. Cl.
CPC ........... *G06F 16/29* (2019.01); *B60W 60/001* (2020.02); *B60W 2556/40* (2020.02); *B60W 2556/45* (2020.02)

(58) Field of Classification Search
CPC . G06F 16/20; B60W 60/001; B60W 2556/40; B60W 2556/45
See application file for complete search history.

(56) References Cited

U.S. PATENT DOCUMENTS

| 11,217,045 B2 | 1/2022 | Uno |
| 2005/0065711 A1 | 3/2005 | Dahlgren et al. |

(Continued)

FOREIGN PATENT DOCUMENTS

| CN | 110155066 A | 8/2019 |
| CN | 110949375 A | 4/2020 |

(Continued)

OTHER PUBLICATIONS

U.S. Appl. No. 17/804,190, filed May 26, 2022 Inventor: Satoshi Uno.

(Continued)

*Primary Examiner* — Hunter B Lonsberry
*Assistant Examiner* — Jay Khandpur
(74) *Attorney, Agent, or Firm* — Dinsmore & Shohl LLP

(57) ABSTRACT

An information processing server is configured to acquire target vehicle data having traveling conditions of target vehicles and position information of the target vehicles on a map, recognize, based on the target vehicle data, an unstable behavior position on the map where at least one of the target vehicles exhibits unstable behavior, measure an occurrence count of the unstable behavior positions within a predetermined period in a mesh preset on the map, enlarge the mesh to include the unstable behavior positions within the predetermined period such that the occurrence count of the unstable behavior positions is equal to or larger than a first threshold, and store the mesh and the unstable behavior positions of the mesh in a storage database related to each other.

10 Claims, 17 Drawing Sheets

(56) References Cited

U.S. PATENT DOCUMENTS

| | | | |
|---|---|---|---|
| 2009/0319139 A1* | 12/2009 | Kondou | B60W 30/18136 |
| | | | 701/55 |
| 2012/0022782 A1 | 1/2012 | Laube et al. | |
| 2016/0133131 A1 | 5/2016 | Grimm et al. | |
| 2016/0280224 A1 | 9/2016 | Tatourian et al. | |
| 2018/0211520 A1 | 7/2018 | Offenhaeuser et al. | |
| 2020/0098203 A1 | 3/2020 | Uno | |
| 2020/0307551 A1* | 10/2020 | Horiguchi | B60W 30/02 |
| 2023/0120095 A1* | 4/2023 | Horihata | G08G 1/0141 |
| | | | 701/301 |

FOREIGN PATENT DOCUMENTS

| | | | | |
|---|---|---|---|---|
| EP | 3441724 A1 | 9/2020 | | |
| JP | 2013-544695 A | 12/2013 | | |
| JP | 2019111867 A | * 7/2019 | | B60W 30/095 |
| JP | 2020-052607 A | 4/2020 | | |
| WO | 2012-047743 A2 | 4/2012 | | |

OTHER PUBLICATIONS

U.S. Appl. No. 17/825,432, filed May 26, 2022 Inventor: Satoshi Uno.

Enriquez Denrie Jr et al: "On Software-based Remote Vehicle Monitoring for Detection and Mapping of Slippery Road Sections", International Journal of Intelligent Transportation Systems Research, Springer US, Boston, vol. 15, No. 3, Jul. 22, 2016 (Jul. 22, 2016), pp. 141-154.

* cited by examiner

| PRECEDING TARGET VEHICLE \ SUCCEEDING TARGET VEHICLE | WITH UNSTABLE BEHAVIOR | WITHOUT UNSTABLE BEHAVIOR |
|---|---|---|
| WITH UNSTABLE BEHAVIOR | SCENE 1 | SCENE 3 |
| WITHOUT UNSTABLE BEHAVIOR | SCENE 2 | SCENE 4 |

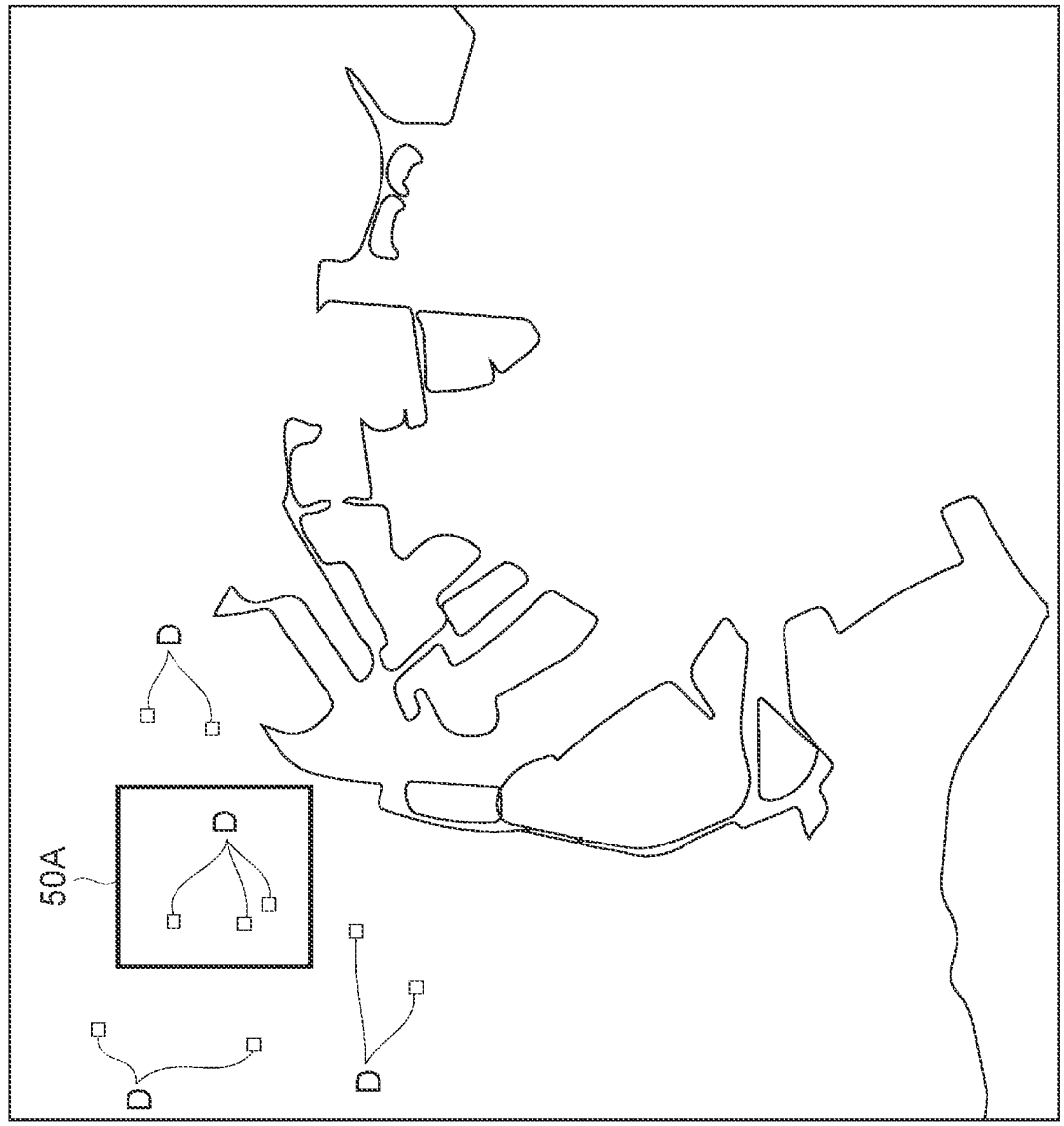

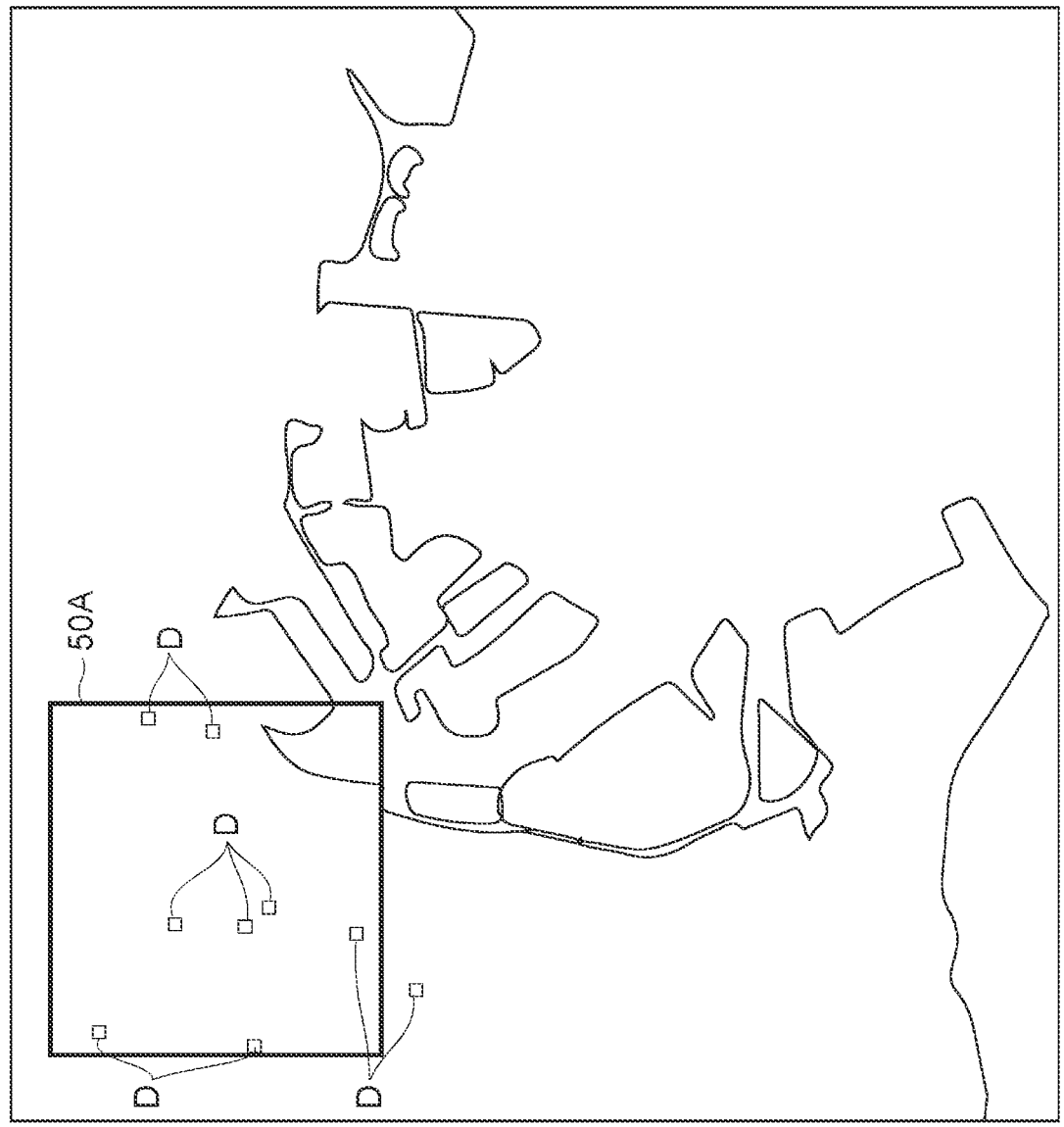

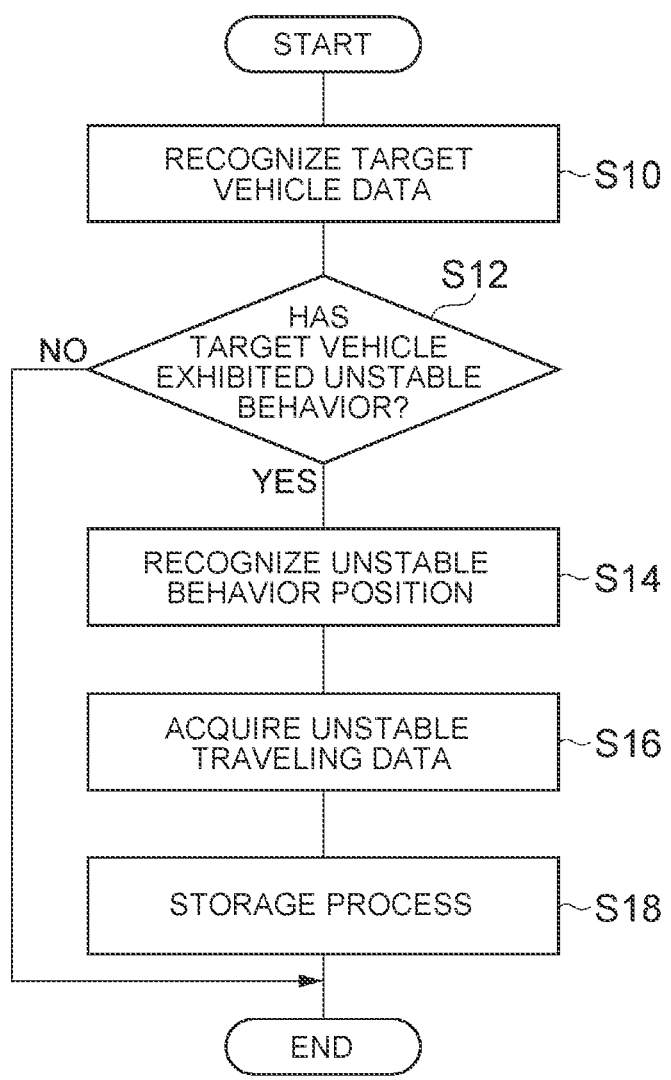

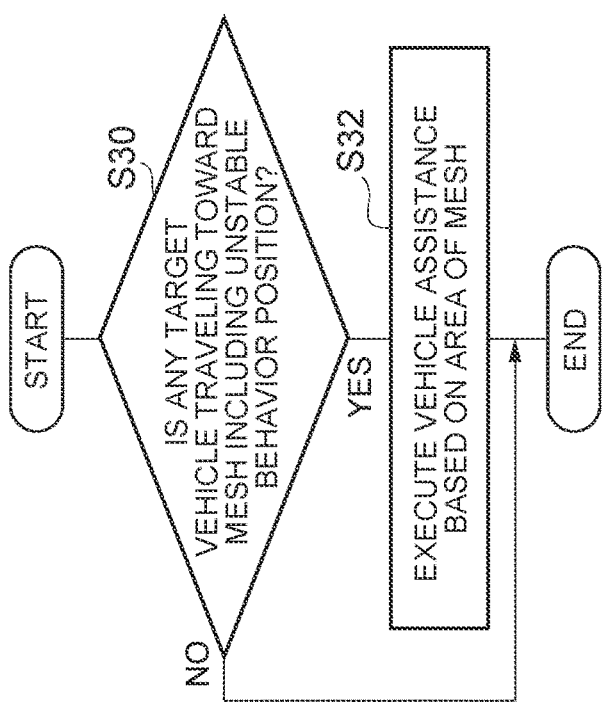
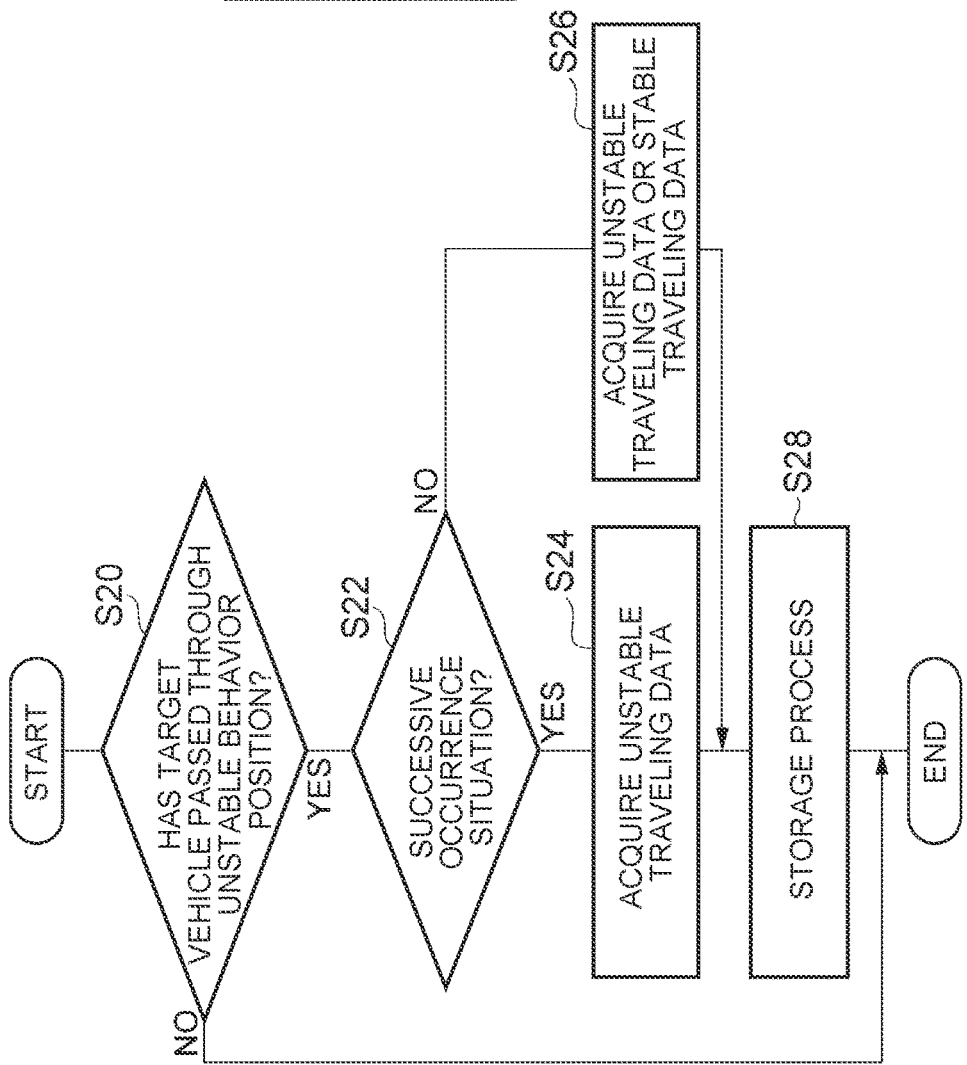
FIG. 12A
FIG. 12B

INFORMATION PROCESSING SERVER, PROCESSING METHOD FOR INFORMATION PROCESSING SERVER, AND NON-TRANSITORY STORAGE MEDIUM

CROSS-REFERENCE TO RELATED APPLICATION

This application claims priority to Japanese Patent Application No. 2021-094351 filed on Jun. 4, 2021, incorporated herein by reference in its entirety.

BACKGROUND

1. Technical Field

The present disclosure relates to an information processing server, a processing method for the information processing server, and a non-transitory storage medium.

2. Description of Related Art

For example, Japanese Unexamined Patent Application Publication (Translation of PCT Application) No. 2013-544695 (JP 2013-544695 A) is known about information processing related to traveling of a vehicle. This document describes a process of notifying other neighboring vehicles about a zone where a driver feels that autonomous driving is not safe when driving an autonomous driving vehicle.

SUMMARY

Position information on the occurrence of unstable behavior of a vehicle may be collected as information on the traveling of the vehicle. However, the position of the occurrence of the unstable behavior of the vehicle varies depending on various factors such as a vehicle speed at that time even if the cause is the same. Even in such a case, it is desirable to appropriately manage the position information in association.

A first aspect of the present disclosure relates to an information processing server. The information processing server includes a target vehicle data acquisition unit configured to acquire target vehicle data having traveling conditions of target vehicles and position information of the target vehicles on a map, an unstable behavior position recognition unit configured to recognize, based on the target vehicle data, an unstable behavior position on the map where at least one of the target vehicles exhibits unstable behavior, an occurrence counting unit configured to measure an occurrence count of unstable behavior positions within a predetermined period in a mesh preset on the map, a mesh enlarging unit configured to enlarge the mesh to include the unstable behavior positions within the predetermined period such that the occurrence count of the unstable behavior positions is equal to or larger than a first threshold, and a storage processor configured to store the mesh and the unstable behavior positions of the mesh in a storage database related each other.

According to the first aspect, the mesh preset on the map is enlarged to include the unstable behavior positions within the predetermined period in the mesh with the occurrence count equal to or larger than the first threshold, and the mesh and the unstable behavior positions in the mesh are stored in the storage database in association with each other. Thus, the information on the unstable behavior positions can appropriately be managed in association with the mesh on the map.

In the first aspect, the mesh enlarging unit may be configured to terminate enlargement of the mesh when the mesh is enlarged to a predetermined upper limit while the occurrence count of the included unstable behavior positions within the predetermined period is not equal to or larger than the first threshold.

According to the configuration described above, it is possible to avoid repeatedly enlarging a less necessary mesh by determining the upper limit of the mesh enlargement.

In the first aspect, the information processing server may further include a vehicle assistant unit configured to, when one of the target vehicles is traveling toward the mesh including the unstable behavior positions, provide vehicle assistance related to the unstable behavior positions in the mesh for the target vehicle. The vehicle assistant unit may be configured to change a vehicle assistance content depending on a size of the mesh.

According to the configuration described above, the density of the unstable behavior positions in the mesh may decrease as the mesh is enlarged by the mesh enlarging unit. Therefore, the vehicle assistance content for the target vehicle can appropriately be changed depending on the size of the mesh.

In the first aspect, the mesh enlarging unit may be configured to measure the number of occurrences of an intermittent operation corresponding to unstable behaviors of the same target vehicle during the same trip in the mesh based on the target vehicle data, the unstable behavior positions, and the mesh, and divide, into a plurality of parts, the mesh where the number of occurrences of the intermittent operation is equal to or larger than an intermittent operation count threshold and a distance between the unstable behaviors in the intermittent operation of the same target vehicle is equal to or longer than a predetermined distance.

According to the configuration described above, there is a possibility that a plurality of unstable behaviors has occurred in the same target vehicle due to different causes in the mesh where the number of occurrences of the intermittent operation is equal to or larger than the intermittent operation count threshold and the distance between the unstable behaviors in the intermittent operation of the same target vehicle is equal to or longer than the predetermined distance. Therefore, appropriate management can be achieved by dividing the mesh.

In the first aspect, the information processing server may include a reproduction frequency measuring unit configured to measure a reproduction frequency of the unstable behavior in a reproduction frequency measurement area based on the unstable behavior positions associated with the mesh and the reproduction frequency measurement area including at least one mesh, a remaining period setting unit configured to set a remaining period of each of the unstable behavior positions in the reproduction frequency measurement area based on the reproduction frequency of the unstable behavior in the reproduction frequency measurement area, and a vehicle assistant unit configured to provide vehicle assistance related to the unstable behavior positions in the mesh for the target vehicle when one of the target vehicles is traveling toward the mesh including the unstable behavior positions. The vehicle assistant unit may be configured not to provide, for the target vehicle, the vehicle assistance related to the unstable behavior position in which the remaining period elapses among the unstable behavior positions in the reproduction frequency measurement area.

According to the configuration described above, the remaining period of the unstable behavior position is set based on the reproduction frequency of the unstable behavior in the reproduction frequency measurement area, and the vehicle assistance is not provided for the unstable behavior position whose remaining period has elapsed. Thus, it is possible to reduce execution of less necessary vehicle assistance.

In the first aspect, the information processing server may include a vehicle assistant unit configured to provide vehicle assistance related to the unstable behavior positions in the mesh for the target vehicle when one of the target vehicles is traveling toward the mesh including the unstable behavior positions, a road environment information acquiring unit configured to acquire road environment information associated with the map, and a remaining period setting unit configured to set a remaining period of each of the unstable behavior positions based on the road environment information. The vehicle assistant unit may be configured not to provide, for the target vehicle, the vehicle assistance related to the unstable behavior position in which the remaining period elapses among the unstable behavior positions of the mesh.

According to the configuration described above, the remaining period of the unstable behavior position is set based on the road environment information, and the vehicle assistance is not provided for the unstable behavior position whose remaining period has elapsed. Thus, it is possible to reduce execution of unnecessary vehicle assistance for the unstable behavior that no longer occurs due to a change in the road environment condition.

In the first aspect, the road environment information acquiring unit may be configured to acquire weather forecast information associated with the mesh as the road environment information.

According to the configuration described above, the remaining period of the unstable behavior position is set based on the weather forecast information. Thus, the remaining period can appropriately be set based on prediction of a change in weather.

In the first aspect, the information processing server may include a vehicle coverage determination unit configured to determine whether a target vehicle coverage in the mesh is low based on the target vehicle data of the target vehicles passing through the mesh, and a vehicle assistant unit configured to, when one of the target vehicles is traveling toward the mesh including the unstable behavior positions, provide vehicle assistance related to the unstable behavior positions in the mesh for the target vehicle. The vehicle assistant unit may be configured not to provide the vehicle assistance for the target vehicle when the vehicle coverage determination unit determines that the target vehicle coverage in the mesh toward which the target vehicle is traveling is low. The target vehicle may be traveling toward the mesh.

According to the configuration described above, when determination is made that the target vehicle coverage in the mesh toward which the target vehicle is traveling is low, there is a strong possibility that the freshness of the information related to the unstable behavior position in the mesh is low. It is possible to avoid vehicle assistance that is based on inappropriate information by preventing execution of the vehicle assistance.

In the first aspect, the information processing server may include a situation determination unit configured to, based on whether a plurality of the target vehicles exhibits the unstable behavior at each of the unstable behavior positions, determine whether the unstable behavior position is in a successive occurrence situation or an unsuccessive occurrence situation. The successive occurrence situation may be a situation in which the unstable behavior has occurred successively. The unsuccessive occurrence situation may be a situation in which the unstable behavior has not occurred successively. The mesh enlarging unit may be configured to enlarge the mesh as the occurrence count of the unstable behavior positions by using a determination count of the successive occurrence situations of the unstable behavior positions within the predetermined period.

According to the configuration described above, the mesh is enlarged by using, as the occurrence count of the unstable behavior positions, the determination count of the successive occurrence situations of the unstable behavior positions within the predetermined period. Thus, the mesh can appropriately be enlarged so that the determination count of the successive occurrence situations with high reproducibility reaches a value equal to or larger than the first threshold.

A second aspect of the present disclosure relates to a processing method for an information processing server. The processing method includes a target vehicle data acquisition step for acquiring target vehicle data having traveling conditions of target vehicles and position information of the target vehicles on a map, an unstable behavior position recognition step for recognizing, based on the target vehicle data, an unstable behavior position on the map where at least one of the target vehicles exhibits unstable behavior, an occurrence count measuring step for measuring an occurrence count of unstable behavior positions within a predetermined period in a mesh preset on the map, a mesh enlargement step for enlarging the mesh to include the unstable behavior positions within the predetermined period such that the occurrence count of the unstable behavior positions (D) is equal to or larger than a first threshold, and a storage process step for storing the mesh and the unstable behavior positions of the mesh in a storage database related to each other.

According to the second aspect, the mesh preset on the map is enlarged to include the unstable behavior positions within the predetermined period in the mesh with the occurrence count equal to or larger than the first threshold, and the mesh and the unstable behavior positions in the mesh are stored in the storage database in association with each other. Thus, the information on the unstable behavior positions can appropriately be managed in association with the mesh on the map.

A third aspect of the present disclosure relates to a non-transitory storage medium storing instructions that are executable by one or more processors and that cause the one or more processors to perform functions. The functions include acquiring target vehicle data having traveling conditions of target vehicles and position information of the target vehicles on a map, recognizing, based on the target vehicle data, an unstable behavior position on the map where at least one of the target vehicles exhibits unstable behavior, measuring an occurrence count of unstable behavior positions within a predetermined period in a mesh preset on the map, enlarging the mesh to include the unstable behavior positions within the predetermined period such that the occurrence count of the unstable behavior positions is equal to or larger than a first threshold, and storing the mesh and the unstable behavior positions of the mesh in a storage database related to each other.

According to the third aspect, the mesh preset on the map is enlarged to include the unstable behavior positions within the predetermined period in the mesh with the occurrence count equal to or larger than the first threshold, and the mesh and the unstable behavior positions in the mesh are stored in the storage database in association with each other. Thus, the information on the unstable behavior positions can appropriately be managed in association with the mesh on the map.

According to the first aspect, the second aspect, and the third aspect of the present disclosure, the information on the unstable behavior positions can appropriately be managed in association with the mesh on the map.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram for explaining an occurrence count of unstable behavior positions in the mesh;

FIG. 10 is a diagram for explaining enlargement of the mesh;

FIG. 11 is a flowchart showing an example of a storage process for unstable behavior position information;

FIG. 12A is a flowchart showing an example of a successive occurrence situation determination process;

FIG. 12B is a flowchart showing an example of a target vehicle assistance process;

DETAILED DESCRIPTION OF EMBODIMENTS

Embodiments of the present disclosure will be described below with reference to the drawings.

First Embodiment

Figure 1:
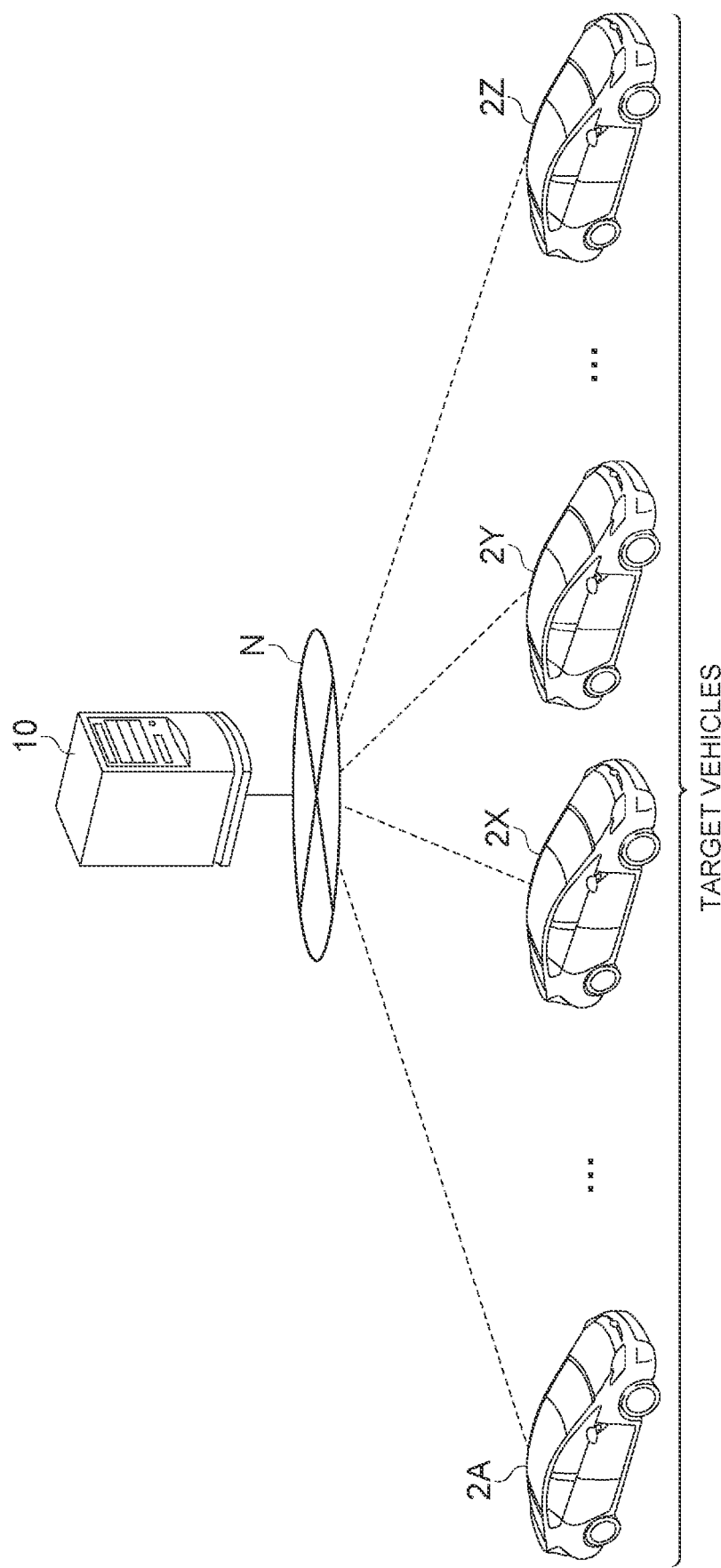
FIG. 1 is a diagram showing an information processing server and target vehicles according to a first embodiment.

FIG. 1 is a diagram showing an information processing server 10 and target vehicles 2 according to a first embodiment. As shown in FIG. 1, the information processing server 10 is communicably connected to the target vehicles 2 (2A to 2Z) via a network N. The network N is a wireless communication network. The target vehicle 2 means a vehicle from which information is collected by the information processing server 10. The target vehicles 2 include an assistance target vehicle to which various types of assistance are provided from the information processing server 10. When the target vehicles 2 are described individually, the term "target vehicles 2A to 2Z" is used.

Figure 2:
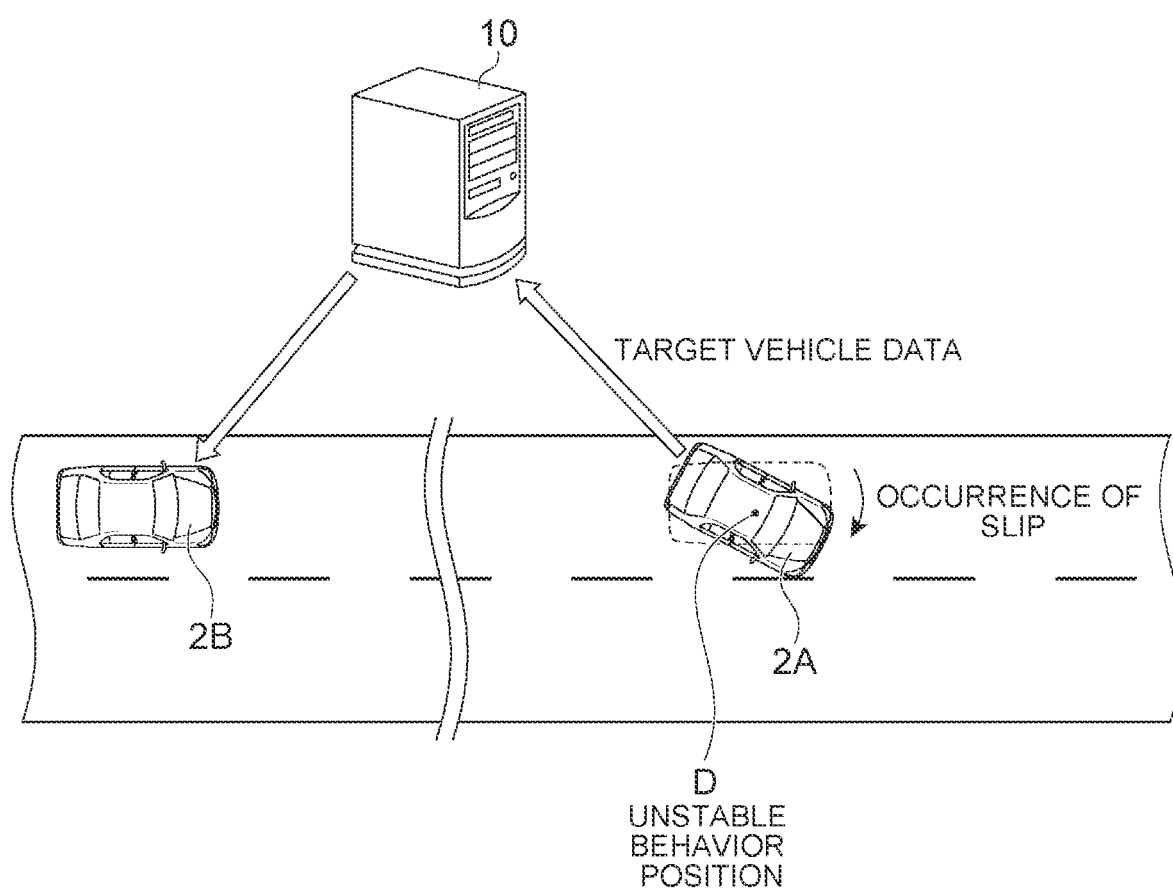
FIG. 2 is a diagram for explaining an example of information processing.

FIG. 2 is a diagram for explaining an example of information processing. As shown in FIG. 2, when the target vehicle 2A has slipped due to road surface freezing or the like, the target vehicle 2A transmits, to the information processing server 10, target vehicle data including an unstable behavior position D where the slip has occurred. The information processing server 10 notifies, for example, the target vehicle 2B traveling behind the target vehicle 2A about information on the unstable behavior position. As a result, the target vehicle 2B can reduce the occurrence of slip of the target vehicle 2B at the unstable behavior position D. The unstable behavior position will be described in detail later.

Configuration of Target Vehicle

First, the configuration of the target vehicle 2 will be described. An identification (ID) for identifying the vehicle (vehicle identification number) is assigned to the target vehicle 2. The number of target vehicles 2 may be one, two or more, several tens or more, or several hundred or more. The target vehicles 2 need not have the same configuration, and may differ in terms of vehicle models or the like. The target vehicle 2 may be an autonomous driving vehicle having an autonomous driving function, or may be a vehicle without the autonomous driving function.

Figure 3:
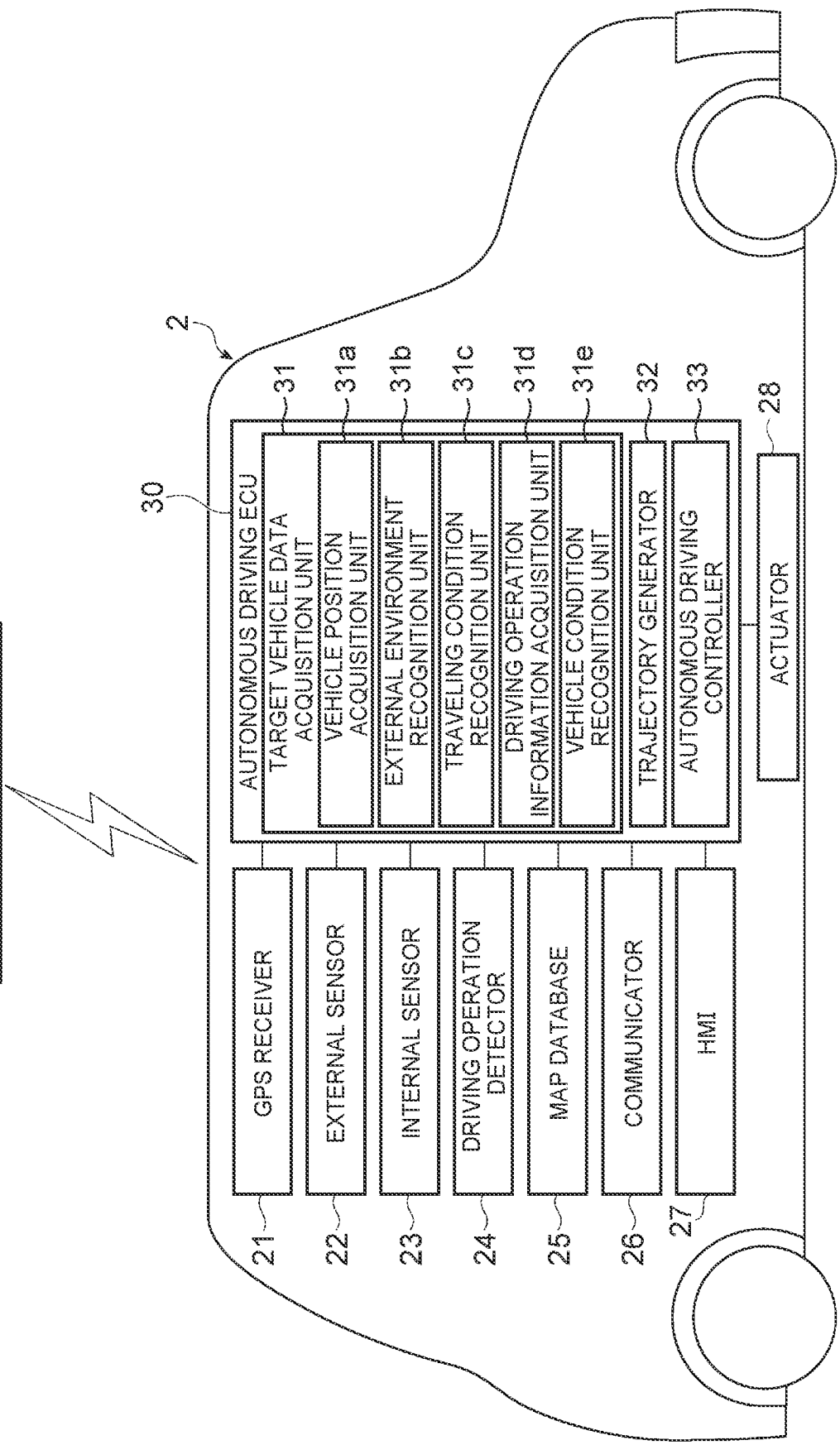
FIG. 3 is a block diagram showing an example of the configuration of the target vehicle.

Hereinafter, the target vehicle 2 will be described with reference to FIG. 3. FIG. 3 is a block diagram showing an example of the configuration of the target vehicle 2. The target vehicle 2 will be described as an autonomous driving vehicle.

As shown in FIG. 3, the target vehicle 2 includes an autonomous driving electronic control unit (ECU) 30. The autonomous driving ECU 30 is an electronic control unit including a central processing unit (CPU), a read-only memory (ROM), a random-access memory (RAM), and the like. In the autonomous driving ECU 30, for example, a program stored in the ROM is loaded into the RAM, and the program loaded in the RAM is executed by the CPU to implement various functions. The autonomous driving ECU 30 may be constituted from a plurality of electronic units.

The autonomous driving ECU 30 is connected to a global positioning system (GPS) receiver 21, an external sensor 22, an internal sensor 23, a driving operation detector 24, a map database 25, a communicator 26, a human-machine interface (HMI) 27, and an actuator 28.

The GPS receiver 21 measures the position of the target vehicle 2 (for example, the latitude and longitude of the target vehicle 2) by receiving signals from three or more GPS satellites. The GPS receiver 21 transmits information on the measured position of the target vehicle 2 to the autonomous driving ECU 30.

The external sensor 22 is a detection device that detects an external environment of the target vehicle 2. The external sensor 22 includes at least one of a camera and a radar sensor.

The camera is an imaging device that images the external environment of the target vehicle 2. The camera is provided on a back side of a windshield of the target vehicle 2, and images a view ahead of the vehicle. The camera transmits imaging information on the external environment of the target vehicle 2 to the autonomous driving ECU 30. The camera may be a monocular camera or a stereo camera.

The radar sensor is a detection device that detects an object around the target vehicle 2 by using radio waves (for example, millimeter waves) or light. Examples of the radar sensor include a millimeter-wave radar and a light detection and ranging (LIDAR) sensor. The radar sensor detects an object by transmitting radio waves or light to the surroundings of the target vehicle 2 and receiving the radio waves or light reflected by the object. The radar sensor transmits information on the detected object to the autonomous driving ECU 30. Examples of the object include stationary objects such as guardrails and buildings and mobile objects such as pedestrians, bicycles, and other vehicles. The external sensor 22 may include an outside air temperature sensor that detects an outside air temperature around the target vehicle 2. The external sensor 22 may include a light sensor that detects the brightness of the outside.

The internal sensor 23 is a detection device that detects conditions of the target vehicle 2. The internal sensor 23 includes a vehicle speed sensor, an acceleration sensor, and a yaw rate sensor as sensors for detecting traveling conditions of the target vehicle 2. The vehicle speed sensor is a detector that detects the speed of the target vehicle 2. The vehicle speed sensor may be a wheel speed sensor that is provided on each wheel of the target vehicle 2 or a drive shaft that rotates together with the wheel and detects a rotation speed of the wheel. The vehicle speed sensor transmits information on the detected vehicle speed (wheel speed) to the autonomous driving ECU 30.

The acceleration sensor is a detector that detects the acceleration of the target vehicle 2. The acceleration sensor includes, for example, a longitudinal acceleration sensor that detects an acceleration of the target vehicle 2 in a fore-and-aft direction. The acceleration sensor may include a lateral acceleration sensor that detects a lateral acceleration of the target vehicle 2. For example, the acceleration sensor transmits information on the acceleration of the target vehicle 2 to the autonomous driving ECU 30. The yaw rate sensor is a detector that detects a yaw rate (rotational angular velocity) about a vertical axis of the center of gravity of the target vehicle 2. Examples of the yaw rate sensor include a gyro sensor. The yaw rate sensor transmits information on the detected yaw rate of the target vehicle 2 to the autonomous driving ECU 30.

The internal sensor 23 detects at least one of a tire pressure, a wiper operation status, and a lighting status as the vehicle conditions of the target vehicle 2. The tire pressure is an air pressure in each tire of the target vehicle 2. The wiper operation status may include not only information on whether the wiper is operating but also an operating speed of the wiper. The lighting status includes a lighting status of a turn signal. The lighting status may include information on whether headlights are turned ON and information on whether fog lamps are turned ON.

The internal sensor 23 may detect, as the vehicle conditions of the target vehicle 2, a brake pressure of a hydraulic brake system from a brake pressure sensor, and ON/OFF of traveling assistance (for example, a vehicle stability control system described later). The internal sensor 23 may detect a load condition of each wheel from a wheel load sensor as the vehicle condition of the target vehicle 2. The internal sensor 23 may include a malfunction detector that detects various malfunctions in the target vehicle 2.

The driving operation detector 24 detects a driver's operation on an operator of the target vehicle 2. The driving operation detector 24 includes, for example, a steering sensor, an accelerator sensor, and a brake sensor. The operator of the target vehicle 2 is a device to be used by the driver to input an operation for driving the vehicle. The operator of the target vehicle 2 includes at least one of a steering unit, an accelerator operator, and a brake operator. Examples of the steering unit include a steering wheel. The steering unit is not limited to the device having the wheel shape, and may be any device that functions as a steering wheel. Examples of the accelerator operator include an accelerator pedal. Examples of the brake operator include a brake pedal. The accelerator operator and the brake operator need not be the pedals, and may be any devices that allow the driver to input acceleration or deceleration. The operator may be an in-vehicle switch. An information terminal such as a driver's smartphone may function as the operator.

The steering sensor detects the amount of operation on the steering unit by the driver. The operation amount of the steering unit includes a steering angle. The operation amount of the steering unit may include a steering torque. The accelerator sensor detects the amount of operation on the accelerator operator by the driver. The operation amount of the accelerator operator includes, for example, a depression amount of the accelerator pedal. The brake sensor detects the amount of operation on the brake operator by the driver. The operation amount of the brake operator includes, for example, a depression amount of the brake pedal. The brake sensor may detect a master cylinder pressure of the hydraulic brake system. The operation amounts of the accelerator operator and the brake operator may include depression speeds. The driving operation detector 24 transmits operation amount information on the detected driver's operation amounts to the autonomous driving ECU 30.

The map database 25 stores map information. The map database 25 is constructed in a storage device such as a hard disk drive (HDD) mounted on the target vehicle 2. The map information includes road position information, road shape information (for example, curvature information), position information on intersections and branch points, and the like. The map information may include information on traffic regulations such as legal speeds associated with position information. The map information may include target information to be used for recognizing the position of the target vehicle 2 on a map. Examples of the target include lane marking lines, traffic lights, guardrails, and road markings. The map database 25 may be constructed in a server (not limited to the information processing server 10) capable of communicating with the target vehicle 2.

The communicator 26 is a communication device that controls wireless communication with the outside of the target vehicle 2. Various types of information are transmitted and received via the network N. The communicator 26 transmits various types of information to the information processing server 10 in response to a signal from the autonomous driving ECU 30.

The HMI 27 is an interface for inputting and outputting information between the autonomous driving ECU 30 and the driver or occupant. The HMI 27 includes, for example, a display and a loudspeaker provided in a vehicle cabin. The HMI 27 outputs images on the display and voice or sound from the loudspeaker in response to a control signal from the autonomous driving ECU 30.

The actuator 28 is a device to be used to control the target vehicle 2. The actuator 28 includes at least a drive actuator, a brake actuator, and a steering actuator. The drive actuator controls a drive force of the target vehicle 2 by controlling the amount of air to be supplied to an engine (throttle valve opening degree) in response to a control signal from the autonomous driving ECU 30. When the target vehicle 2 is a hybrid electric vehicle, the drive force is controlled by inputting a control signal from the autonomous driving ECU 30 to a motor serving as a power source, in addition to the amount of air to be supplied to the engine. When the target vehicle 2 is a battery electric vehicle, the drive force is controlled by inputting a control signal from the autonomous driving ECU 30 to a motor serving as a power source. In such cases, the motor serving as the power source constitutes the actuator 28.

The brake actuator controls a braking force to be applied to the wheels of the target vehicle 2 by controlling the brake system in response to a control signal from the autonomous driving ECU 30. Examples of the brake system include a hydraulic brake system. The steering actuator controls drive of an assist motor that controls a steering torque in an electric power steering system in response to a control signal from the autonomous driving ECU 30. Thus, the steering actuator controls the steering torque of the target vehicle 2.

Next, the functional configuration of the autonomous driving ECU 30 will be described. As shown in FIG. 3, the autonomous driving ECU 30 includes a target vehicle data acquisition unit 31, a trajectory generator 32, and an autonomous driving controller 33. Some of the functions of the autonomous driving ECU 30 described below may be executed on a server (not limited to the information processing server 10) capable of communicating with the target vehicle 2.

The target vehicle data acquisition unit 31 acquires target vehicle data related to the target vehicle 2. The target vehicle data includes position information of the target vehicle 2 on a map and traveling conditions of the target vehicle 2. The target vehicle data may include an external environment of the target vehicle 2 or a route where the target vehicle 2 travels. The target vehicle data may include driving operation information of the driver of the target vehicle 2 and vehicle conditions of the target vehicle 2. The target vehicle data acquisition unit 31 transmits the acquired target vehicle data to the information processing server 10.

The target vehicle data acquisition unit 31 includes a vehicle position acquisition unit 31a, an external environment recognition unit 31b, a traveling condition recognition unit 31c, a driving operation information acquisition unit 31d, and a vehicle condition recognition unit (vehicle condition recognizer) 31e.

The vehicle position acquisition unit 31a acquires position information of the target vehicle 2 on a map based on position information from the GPS receiver 21 and the map information in the map database 25. The vehicle position acquisition unit 31a may acquire the position information of the target vehicle 2 by a simultaneous localization and mapping (SLAM) technology using the target information included in the map information in the map database 25 and a detection result from the external sensor 22. The vehicle position acquisition unit 31a may recognize a lateral position of the target vehicle 2 with respect to a lane (position of the target vehicle 2 in a lane width direction) based on a positional relationship between lane marking lines and the target vehicle 2, and include the lateral position in the position information. The vehicle position acquisition unit 31a may acquire the position information of the target vehicle 2 on the map by a predetermined method.

The external environment recognition unit 31b recognizes the external environment of the target vehicle 2 based on a detection result from the external sensor 22. The external environment includes the positions of surrounding objects relative to the target vehicle 2. The external environment may include the speeds and moving directions of surrounding objects relative to the target vehicle 2. The external environment may include the types of objects such as other vehicles, pedestrians, and bicycles. The types of objects can be identified by a method such as pattern matching. The external environment may include a result of recognition of marking lines (recognition of lane lines) around the target vehicle 2. The external environment may include an outside air temperature or weather.

The traveling condition recognition unit 31c recognizes the traveling conditions of the target vehicle 2 based on detection results from the internal sensor 23. The traveling conditions include the vehicle speed and the yaw rate of the target vehicle 2. The traveling conditions may include the acceleration of the target vehicle 2. Specifically, the traveling condition recognition unit 31c recognizes the vehicle speed of the target vehicle 2 based on vehicle speed information from the vehicle speed sensor. The traveling condition recognition unit 31c recognizes the acceleration of the target vehicle 2 based on acceleration information from the acceleration sensor. The traveling condition recognition unit 31c recognizes the direction of the target vehicle 2 based on yaw rate information from the yaw rate sensor.

The driving operation information acquisition unit 31d acquires the driving operation information of the target vehicle 2 based on a detection result from the driving operation detector 24. The driving operation information includes, for example, at least one of an accelerator operation amount, a brake operation amount, and a steering amount of the driver.

When the target vehicle 2 has a personal authentication function, the driving operation information acquisition unit 31d stores a driving operation history for each driver who has personally been authenticated. The driving operation history may be associated with the external environment and the traveling conditions of the target vehicle 2. The autonomous driving ECU 30 need not have the driving operation information acquisition unit 31d. In this case, the driving operation detector 24 is also unnecessary.

The vehicle condition recognizer 31e recognizes the vehicle conditions of the target vehicle 2 based on detection results from the internal sensor 23. The vehicle conditions may include a tire pressure. The vehicle conditions may include a wiper operation status and a lighting status, and may include a malfunction status of the target vehicle 2. The autonomous driving ECU 30 need not have the vehicle condition recognizer 31e.

The trajectory generator 32 generates a trajectory to be used for autonomous driving of the target vehicle 2. The trajectory generator 32 generates a trajectory for autonomous driving based on a preset traveling route, the map information, a position of the target vehicle 2 on a map, the external environment of the target vehicle 2, and the traveling conditions of the target vehicle 2.

The traveling route is a route along which the target vehicle 2 travels by autonomous driving. The trajectory generator 32 determines the traveling route for autonomous driving based on, for example, a destination, the map information, and the position of the target vehicle 2 on the map. The traveling route may be set by a navigation system. The destination may be set by an occupant of the target vehicle 2, or may automatically be suggested by the autonomous driving ECU 30 or the navigation system.

The trajectory includes a path along which the vehicle travels by autonomous driving and a vehicle speed profile for autonomous driving. The path is a locus along which the vehicle under autonomous driving is expected to travel on the traveling route. For example, the path can be data (steering angle profile) on variations in the steering angle of the target vehicle 2 associated with positions on the traveling route. For example, the positions on the traveling route are set vertical positions that are set at predetermined intervals (for example, 1 m) in the traveling direction of the traveling route. The steering angle profile is data in which a target steering angle is associated with each set vertical position.

The trajectory generator 32 generates a path along which the vehicle travels, for example, based on the traveling route, the map information, the external environment of the target vehicle 2, and the traveling conditions of the target vehicle 2. The trajectory generator 32 generates the path, for example, so that the target vehicle 2 passes through the center of the lane (center in the lane width direction) included in the traveling route.

A steering torque profile in which a target steering torque is associated with each set vertical position may be used instead of the steering angle profile. A lateral position profile in which a target lateral position is associated with each set vertical position may be used instead of the steering angle profile. The target lateral position is a target position in the width direction of the lane. In this case, the set vertical position and the target lateral position may be set as one position coordinate in combination.

For example, the vehicle speed profile is data in which a target vehicle speed is associated with each set vertical position. The set vertical position may be set with reference to a traveling period of the vehicle instead of the distance. The set vertical position may be set as a position to be reached by the vehicle in one second or a position to be reached by the vehicle in two seconds.

For example, the trajectory generator 32 generates the vehicle speed profile based on the path and speed-related information such as a legal speed included in the map information. A set speed that is preset for a position or section on a map may be used instead of the legal speed. The trajectory generator 32 generates the trajectory for autonomous driving based on the path and the vehicle speed profile. The method for generating the trajectory by the trajectory generator 32 is not limited to that described above, and any other method may be adopted.

When the trajectory generator 32 receives a notification of a traveling path change for avoiding the unstable behavior position from the information processing server 10, the trajectory generator 32 changes the path of the target vehicle 2 so as not to pass through the unstable behavior position. The trajectory generator 32 may change the traveling route (traveling road) where the target vehicle 2 travels, or may change the path of the target vehicle 2 on the same road to keep a predetermined distance or longer in a road width direction from the unstable behavior position.

When the trajectory generator 32 receives a notification of unstable behavior position information and stable traveling data from the information processing server 10, the trajectory generator 32 generates the trajectory so as not to cause unstable behavior of the target vehicle 2 based on the unstable behavior position information and the stable traveling data. The unstable behavior position information and the stable traveling data will be described in detail later. The trajectory generator 32 generates the trajectory so that the traveling conditions of the target vehicle 2 near the unstable behavior position approach traveling conditions in the stable traveling data. When the trajectory generator 32 receives a stable traveling instruction from the information processing server 10 instead of the notification of the stable traveling data, the trajectory generator 32 generates the trajectory in accordance with the stable traveling instruction. The stable traveling instruction will be described in detail later.

The autonomous driving controller 33 executes autonomous driving of the target vehicle 2. The autonomous driving controller 33 executes the autonomous driving of the target vehicle 2 based on, for example, the external environment of the target vehicle 2, the traveling conditions of the target vehicle 2, and the trajectory generated by the trajectory generator 32. The autonomous driving controller 33 executes the autonomous driving of the target vehicle 2 by transmitting a control signal to the actuator 28.

When the autonomous driving controller 33 receives an instruction to cancel the autonomous driving from the information processing server 10, the autonomous driving controller 33 cancels the autonomous driving at the unstable behavior position. The autonomous driving controller 33 notifies the driver about transition to manual driving via the HMI 27. After notifying the driver, the autonomous driving controller 33 cancels the autonomous driving and makes transition to the manual driving by the driver. The autonomous driving controller 33 notifies the driver via the HMI 27 about the unstable behavior position information received from the information processing server 10.

The target vehicle 2 need not be the autonomous driving vehicle. In this case, the ECU of the target vehicle 2 need not have the trajectory generator 32 and the autonomous driving controller 33. The ECU of the target vehicle 2 may have an information provider capable of notifying the driver via the HMI 27 about the unstable behavior position information and the like. The ECU of the target vehicle 2 may include a driving assistant configured to, when the ECU receives a notification of the stable traveling data from the information processing server 10, execute driving assistance so that the traveling conditions of the target vehicle 2 near the unstable behavior position approach the traveling conditions in the stable traveling data. The method for the driving assistance is not particularly limited, and information may be provided to the driver or the traveling of the vehicle may be controlled.

Configuration of Information Processing Server

Figure 4:
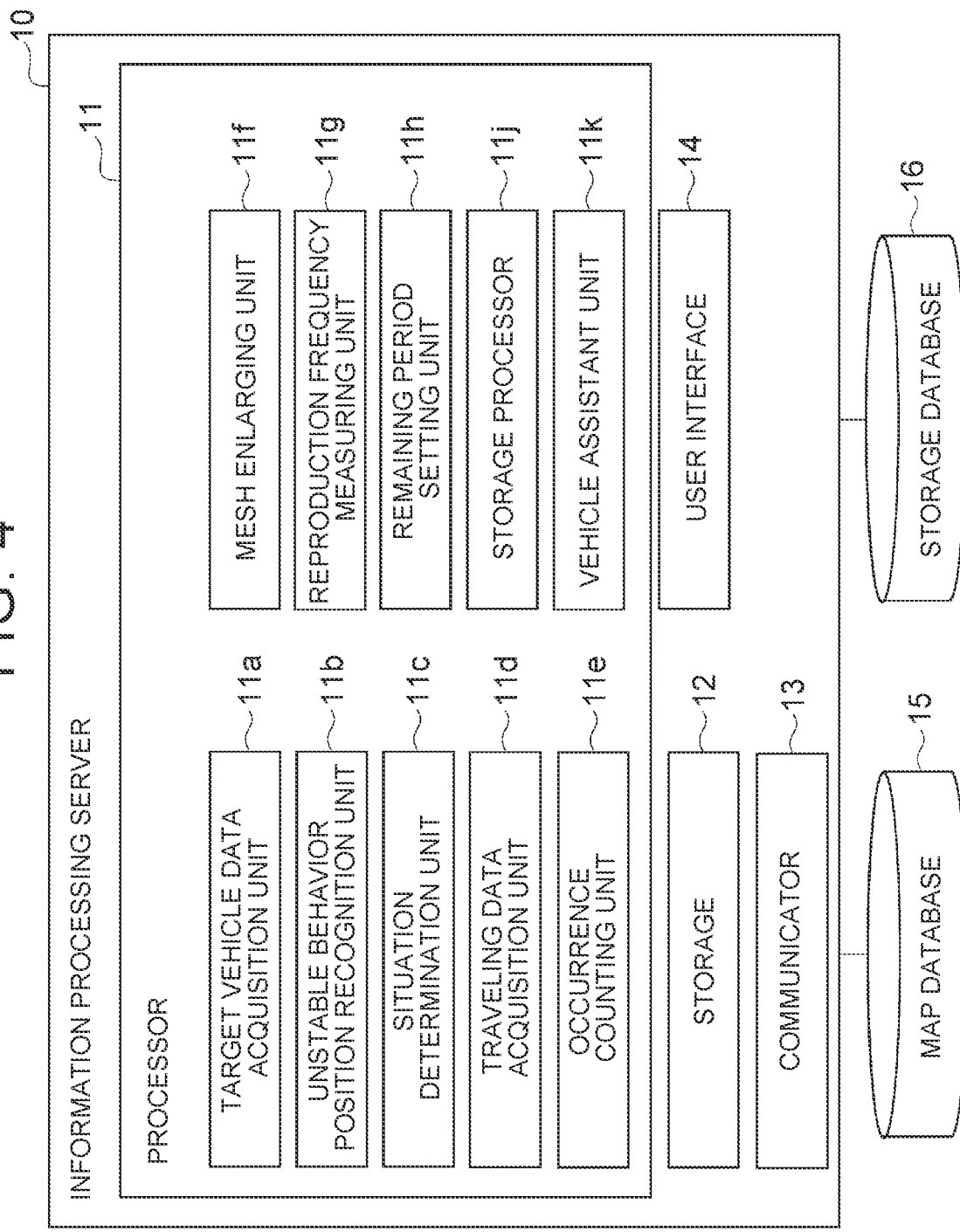
FIG. 4 is a block diagram showing an example of the configuration of the information processing server according to the first embodiment.

The information processing server 10 is provided in a facility such as an information management center and is configured to communicate with the target vehicle 2. FIG. 4 is a block diagram showing an example of the configuration of the information processing server 10. The information processing server 10 shown in FIG. 4 is a general computer including a processor 11, a storage 12, a communicator 13, and a user interface 14.

The processor 11 operates, for example, an operating system to control the information processing server 10. The processor 11 is an arithmetic unit such as a central processing unit (CPU) including a control device, an arithmetic device, a register, and the like. The processor 11 controls the storage 12, the communicator 13, and the user interface 14. The storage 12 includes at least one of a memory and a storage. The memory is a recording medium such as a read-only memory (ROM) and a random-access memory (RAM). The storage is a recording medium such as a hard disk drive (HDD). The storage 12 may be integrated with a storage database 16 described later.

The communicator 13 is a communication device for performing communication via the network N. Examples of the communicator 13 include a network device, a network controller, and a network card. The user interface 14 is a device including an output device such as a display and a loudspeaker, and an input device such as a touch panel. The information processing server 10 need not be installed in the facility, and may be mounted on a moving body such as a vehicle or a ship.

The information processing server 10 is connected to a map database 15 and the storage database 16. The map database 15 stores map information. The map database 15 stores information on a mesh preset on a map. The mesh will be described in detail later. The storage database 16 stores unstable behavior position information and the like. The storage database 16 may have the same configuration as that of a database of the HDD. The storage database 16 may be provided in a facility or the like located away from the information processing server 10. The map database 15 and the storage database 16 may be integrated.

Next, the functional configuration of the processor 11 will be described. As shown in FIG. 4, the processor 11 includes a target vehicle data acquisition unit 11a, an unstable behavior position recognition unit 11b, a situation determination unit 11c, a traveling data acquisition unit 11d, an occurrence counting unit 11e, a mesh enlarging unit 11f, a reproduction frequency measuring unit 11g, a remaining period setting unit 11h, a storage processor 11j, and a vehicle assistant unit 11k.

The target vehicle data acquisition unit 11a recognizes target vehicle data transmitted from the target vehicle 2. The target vehicle data includes position information of the target vehicle 2 on a map and traveling conditions of the target vehicle 2. The target vehicle data may include an external environment of the target vehicle 2 or a route where the target vehicle 2 travels.

The unstable behavior position recognition unit 11b recognizes an unstable behavior position on a map where the target vehicle 2 has exhibited unstable behavior based on the target vehicle data acquired by the target vehicle data acquisition unit 11a. The unstable behavior position recognition unit 11b recognizes the unstable behavior position in association with time. The unstable behavior is behavior of a vehicle that causes instability in the traveling of the vehicle. The unstable behavior includes, for example, slip. The unstable behavior may include sudden deceleration or sudden change in steering angle. The unstable behavior may include a lane deviation of the target vehicle 2 or an excessive approach of the target vehicle 2 to a structure (guardrail or the like).

First, determination about the unstable behavior will be described. The unstable behavior position recognition unit 11b determines whether the target vehicle 2 has exhibited the unstable behavior based on the target vehicle data. For example, the unstable behavior position recognition unit 11b determines whether the target vehicle 2 has slipped as the unstable behavior based on at least one of accelerations detected by the acceleration sensor (longitudinal acceleration and lateral acceleration), a wheel speed of each wheel that is detected by the wheel speed sensor, a yaw rate detected by the yaw rate sensor, a driver's steering angle detected by the steering sensor, a driver's brake operation amount detected by the brake sensor, and a brake pressure from the brake pressure sensor. A master cylinder pressure of the hydraulic brake system may be used instead of the brake operation amount from the brake sensor.

The unstable behavior position recognition unit 11b may use an operation start condition of an antilock brake system (ABS) for the determination about the slip. For example, the antilock brake system is operated when a wheel that may be locked is identified by comparing the wheel speed of each wheel with an estimated body speed. The estimated body speed may be determined from the wheel speed of each wheel before slip or from a change in the acceleration before slip.

The unstable behavior position recognition unit 11b may use an operation start condition of a vehicle stability control (VSC) system or an operation start condition of a traction control (TRC) system for the determination about the slip. The traction control system can be operated when a wheel that may be idling is identified by comparing the wheel speed of each wheel with the estimated body speed. The unstable behavior position recognition unit 11b may determine the slip of the target vehicle 2 by any other method.

The unstable behavior position recognition unit 11b may determine whether the target vehicle 2 has suddenly decelerated as the unstable behavior based on a deceleration detected by the acceleration sensor. In this case, the unstable behavior position recognition unit 11b determines that the target vehicle 2 has suddenly decelerated, for example, when the absolute value of the deceleration is equal to or higher than a sudden deceleration threshold. The sudden deceleration threshold is a preset threshold. Each threshold used in the following description means a preset threshold.

The unstable behavior position recognition unit 11b may determine whether the steering angle has suddenly changed in the target vehicle 2 as the unstable behavior based on the yaw rate detected by the yaw rate sensor. In this case, the unstable behavior position recognition unit 11b determines that the steering angle has suddenly changed in the target vehicle 2, for example, when the yaw rate is equal to or higher than a steering angle change threshold. A tire turning angle may be used instead of the yaw rate.

When the turn signal is not ON, the unstable behavior position recognition unit 11b may determine whether the target vehicle 2 deviates from the lane as the unstable behavior based on a lateral position of the target vehicle 2 or the external environment of the target vehicle 2. In this case, the unstable behavior position recognition unit 11b determines the lane deviation, for example, based on the lateral position of the target vehicle 2. Alternatively, the unstable behavior position recognition unit 11b may determine the lane deviation when the unstable behavior position recognition unit 11b recognizes that the target vehicle 2 has crossed the lane marking line based on the external environment of the target vehicle 2.

The unstable behavior position recognition unit 11b may determine whether the target vehicle 2 has excessively approached an object as the unstable behavior based on the traveling conditions of the target vehicle 2 and the external environment of the target vehicle 2. In this case, the behavior of the target vehicle 2 is not the unstable behavior when the distance from the object is short but the speed is low. Therefore, the unstable behavior position recognition unit 11b determines that the target vehicle 2 has excessively approached the object when the vehicle speed of the target vehicle 2 is equal to or higher than a vehicle speed threshold and a time to collision (TTC) between the target vehicle 2 and the object is equal to or shorter than a TTC threshold. Time headway (THW) or a distance may be used instead of the time to collision.

The determination as to whether the target vehicle 2 has exhibited the unstable behavior may be made every time the target vehicle data is acquired, or may collectively be made at regular time intervals or fixed period intervals. The determination as to whether the target vehicle 2 has exhibited the unstable behavior may be made while the target vehicle 2 is stopped.

Next, recognition of the unstable behavior position will be described. The unstable behavior position is a position of the target vehicle 2 on a map when the target vehicle 2 has exhibited the unstable behavior. The unstable behavior position recognition unit 11b recognizes the unstable behavior position when determination is made that the target vehicle 2 has exhibited the unstable behavior.

The unstable behavior position recognition unit 11b recognizes the unstable behavior position based on position information of the target vehicle 2 on the map when determination is made that the target vehicle 2 has exhibited the unstable behavior. The unstable behavior position is recognized separately for each lane. When the unstable behavior is a lane deviation, the unstable behavior position may be a position on the traveling lane or the lane marking line before the lane deviation.

The unstable behavior position may be recognized as a section or area instead of a point on the map. When the target vehicle 2 has slid while slipping, the unstable behavior position recognition unit 11b may set the unstable behavior position to a start position of the slip or may recognize, as the unstable behavior position, the entire section traveled with the determination that the target vehicle 2 has slipped. The same applies to the other types of unstable behavior.

The situation determination unit 11c determines whether the unstable behavior position recognized by the unstable behavior position recognition unit 11b is in a successive occurrence situation or in an unsuccessive occurrence situation based on whether a plurality of target vehicles 2 has exhibited the unstable behavior at the unstable behavior position.

For example, the situation determination unit 11c determines whether each target vehicle 2 has passed through the unstable behavior position based on the target vehicle data recognized by the target vehicle data acquisition unit 11a and the unstable behavior position recognized by the unstable behavior position recognition unit 11b. When the situation determination unit 11c determines that the target vehicle 2 has passed through the unstable behavior position, the situation determination unit 11c determines whether the unstable behavior position is in the successive occurrence situation or in the unsuccessive occurrence situation based on whether the target vehicle 2 has exhibited the unstable behavior. The situation determination unit 11c may make the above determination by collectively processing a plurality of pieces of target vehicle data in each predetermined period.

The successive occurrence situation is a situation in which the unstable behavior has occurred successively. In the successive occurrence situation, it is less likely that the unstable behavior has occurred due to an individual factor of the target vehicle 2, and it is more likely that the unstable behavior has occurred due to an external factor such as a road environment. The unsuccessive occurrence situation is a situation that is not the successive occurrence situation. In the unsuccessive occurrence situation, it is more likely that the unstable behavior has occurred due to the individual factor of the target vehicle 2. When the situation determination unit 11c does not determine that the unstable behavior position is in the successive occurrence situation, the situation determination unit 11c determines that the unstable behavior position is in the unsuccessive occurrence situation.

Figure 5A:
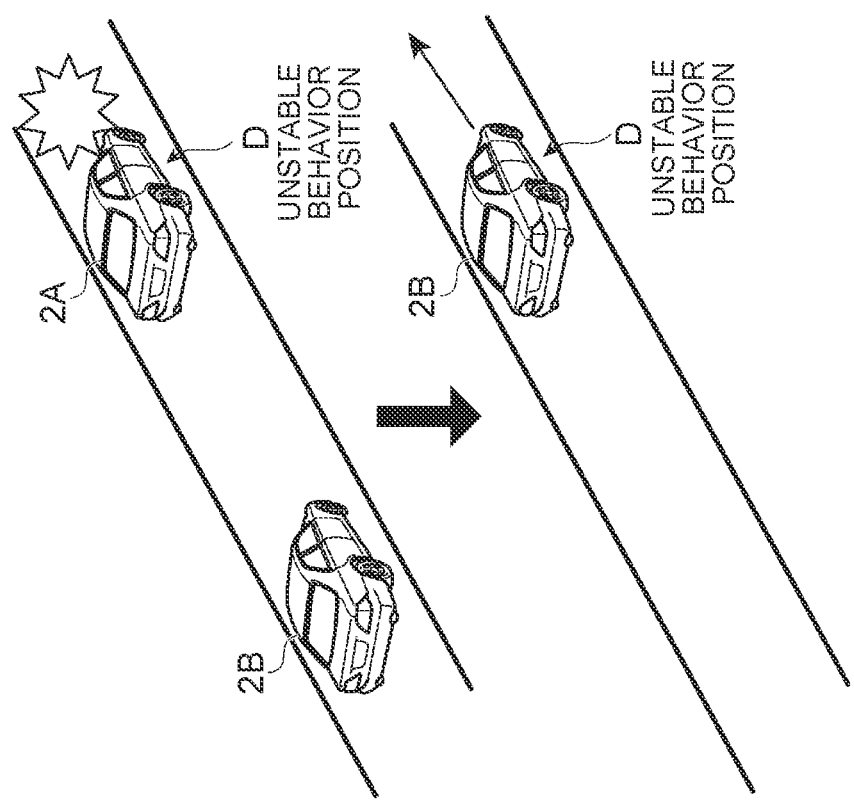
FIG. 5A is a diagram for explaining an example of a successive occurrence situation.
Figure 5B:
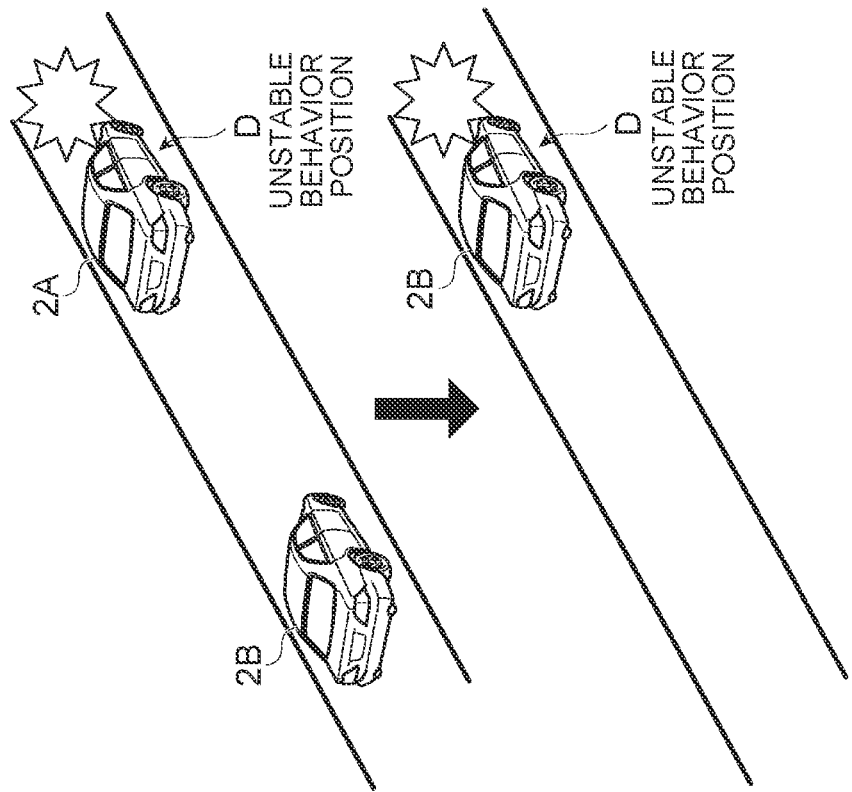
FIG. 5B is a diagram for explaining an example of an unsuccessive occurrence situation.

FIG. 5A is a diagram for explaining an example of the successive occurrence situation. As shown in FIG. 5A, the situation determination unit 11c determines that an unstable behavior position D is in the successive occurrence situation, for example, when two target vehicles 2A and 2B have successively exhibited the unstable behavior at the unstable behavior position. FIG. 5B is a diagram for explaining an example of the unsuccessive occurrence situation. As shown in FIG. 5B, the situation determination unit 11c may determine that the unstable behavior position D is in the unsuccessive occurrence situation when the target vehicle 2A has exhibited the unstable behavior at the unstable behavior position but the succeeding target vehicle 2B has passed without exhibiting the unstable behavior.

The situation shown in FIG. 5A is not the only situation determined as the successive occurrence situation. The situation determination unit 11c may determine that the unstable behavior position D is in the successive occurrence situation when three target vehicles 2A to 2C have successively exhibited the unstable behavior. The situation determination unit 11c may determine that the unstable behavior position D is in the successive occurrence situation when four or more target vehicles 2 have successively exhibited the unstable behavior. The situation determination unit 11c may determine that the unstable behavior position D is in the successive occurrence situation when all the plurality of target vehicles 2 passing through the unstable behavior position D within a predetermined period have exhibited the unstable behavior.

The situation determination unit 11c may determine that the unstable behavior position D is in the successive occurrence situation when one target vehicle 2 has not exhibited the unstable behavior but the target vehicles 2 passing before and after the one target vehicle 2 have exhibited the unstable behavior. Specifically, the situation determination unit 11c may determine that the unstable behavior position D is in the successive occurrence situation when the target vehicle 2B in the middle of the three target vehicles 2A to 2C has passed through the unstable behavior position D without exhibiting the unstable behavior but the target vehicles 2A and 2C have exhibited the unstable behavior. Alternatively, the situation determination unit 11c may determine that the unstable behavior position D is in the successive occurrence situation when a plurality of target vehicles 2 has not exhibited the unstable behavior but the number of target vehicles 2 that have exhibited the unstable behavior within a predetermined period is equal to or larger than a threshold.

Figures 6A, 6B:
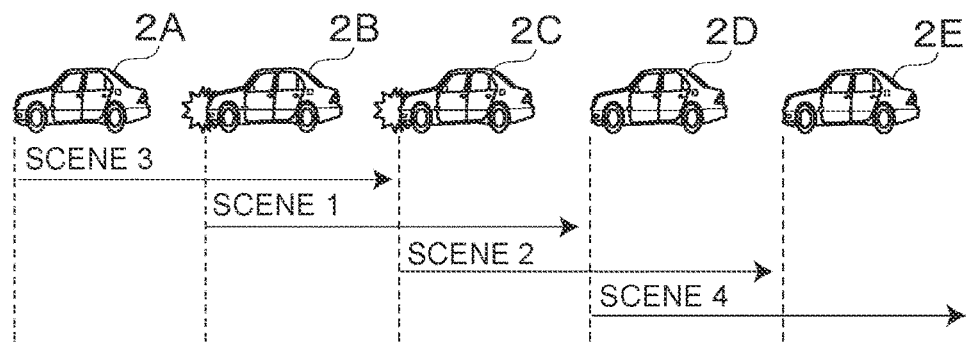
FIG. 6A is a table for explaining an example of scene classification of unstable behavior.
FIG. 6B is a diagram for explaining an example of the scene classification of unstable behavior.

The situation determination unit 11c may determine the successive occurrence situation and the unsuccessive occurrence situation by finer classification. FIG. 6A is a table for explaining an example of scene classification of the unstable behavior. As shown in FIG. 6A, four scenes can be provided by classification based on whether the unstable behavior has occurred, focusing on a preceding target vehicle 2 and a succeeding target vehicle 2 at the unstable behavior position.

In FIG. 6A, Scene 1 is a case where both the preceding target vehicle 2 and the succeeding target vehicle 2 have exhibited the unstable behavior. Scene 2 is a case where only the preceding target vehicle 2 has exhibited the unstable behavior. Scene 3 is a case where only the succeeding target vehicle 2 has exhibited the unstable behavior. Scene 4 is a case where neither the preceding target vehicle 2 nor the succeeding target vehicle 2 has exhibited the unstable behavior. For example, Scene 1 corresponds to the successive occurrence situation, and Scenes 2 to 4 correspond to the unsuccessive occurrence situation.

FIG. 6B is a diagram for explaining an example of the scene classification of the unstable behavior. The target vehicles 2A to 2E have passed the same unstable behavior position in this order. In FIG. 6B, only the target vehicles 2B and 2C among the target vehicles 2A to 2E have exhibited the unstable behavior, and the remaining target vehicles have passed through the unstable behavior position without exhibiting the unstable behavior.

Focusing on the target vehicle 2A and the target vehicle 2B in FIG. 6B, this case corresponds to Scene 3 because only the succeeding target vehicle 2B has exhibited the unstable behavior. Focusing on the target vehicle 2B and the target vehicle 2C, this case corresponds to Scene 1 because both the preceding target vehicle 2B and the succeeding target vehicle 2C have exhibited the unstable behavior. Focusing on the target vehicle 2C and the target vehicle 2D, this case corresponds to Scene 2 because only the preceding target vehicle 2C has exhibited the unstable behavior. Focusing on the target vehicle 2D and the target vehicle 2E, this case corresponds to Scene 4 because neither of the target vehicles 2 has exhibited the unstable behavior. In this way, the situation determination unit 11c may make determination with the classification into Scenes 1 to 4.

When the unstable behavior position recognition unit 11b recognizes the unstable behavior position, the traveling data acquisition unit 11d acquires unstable traveling data based on the target vehicle data recognized by the target vehicle data acquisition unit 11a. The unstable traveling data is data related to traveling conditions of the target vehicle 2 in the past when the unstable behavior occurred at the unstable behavior position. The unstable traveling data can be, for example, data on traveling conditions of the target vehicle 2 between the unstable behavior position and a position at a predetermined distance behind the unstable behavior position. The unstable traveling data may be data on traveling conditions of the target vehicle 2 within a predetermined period before the unstable behavior occurs. The unstable traveling data may include a traveling locus of the target vehicle 2.

When the situation determination unit 11c determines that the unstable behavior position is in the unsuccessive occurrence situation, the traveling data acquisition unit 11d acquires stable traveling data or unstable traveling data based on the target vehicle data.

The stable traveling data is data related to traveling conditions of the target vehicle 2 in the past when the target vehicle 2 passed through the unstable behavior position in the unsuccessive occurrence situation without exhibiting the unstable behavior. The stable traveling data can be, for example, data on traveling conditions of the target vehicle 2 between the unstable behavior position and a position at a predetermined distance behind the unstable behavior position. The stable traveling data may be data on traveling conditions of the target vehicle 2 within a predetermined period before the target vehicle 2 reaches the unstable behavior position. The stable traveling data may include a traveling locus of the target vehicle 2.

The occurrence counting unit 11e measures an occurrence count of unstable behavior positions within a predetermined period in a mesh 50 (see FIG. 7) preset on a map stored in the map database 15 based on information on the mesh on the map and the unstable behavior position recognized by the unstable behavior position recognition unit 11b. The occurrence counting unit 11e may count only the unstable behavior positions determined as being in the successive occurrence situation by the situation determination unit 11c.

The mesh is an area preset on the map. The mesh is used, for example, to collectively manage a plurality of unstable behavior positions. The management includes providing vehicle assistance appropriately in the mesh based on a vehicle assistance content (service content) described later. Information on the mesh is stored in the map database 15.

Figure 7:
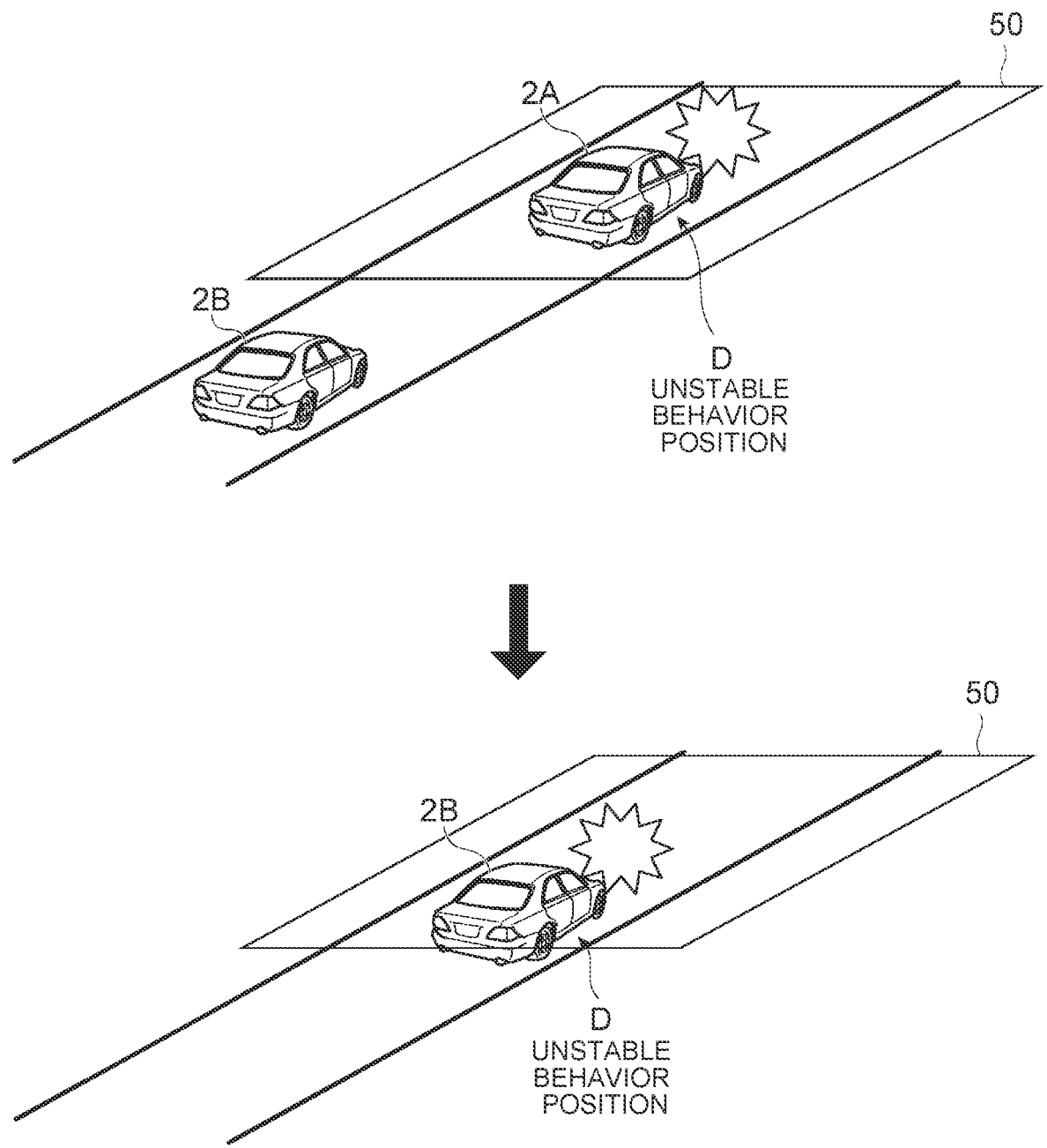
FIG. 7 is a diagram showing an example of a mesh.

FIG. 7 is a diagram showing an example of the mesh. FIG. 7 shows the mesh 50. In FIG. 7, unstable behavior has occurred in the mesh 50 as slip due to the same road surface freezing. In this case, the position of the slip of the target vehicle 2A (unstable behavior position D) is not necessarily identical to the position of the slip of the succeeding target vehicle 2B (unstable behavior position D). The unstable behavior position D may vary depending on, for example, a difference in the vehicle speed between the target vehicle 2A and the target vehicle 2B. Even in such a case, the unstable behavior position D of the target vehicle 2A and the unstable behavior position D of the target vehicle 2B can collectively be managed by using the mesh 50. Thus, the management can be made more efficient than in a case where the unstable behavior positions D are managed individually.

In addition, appropriate vehicle assistance can be realized by utilizing the mesh 50 based on the vehicle assistance content described later.

Figure 8:
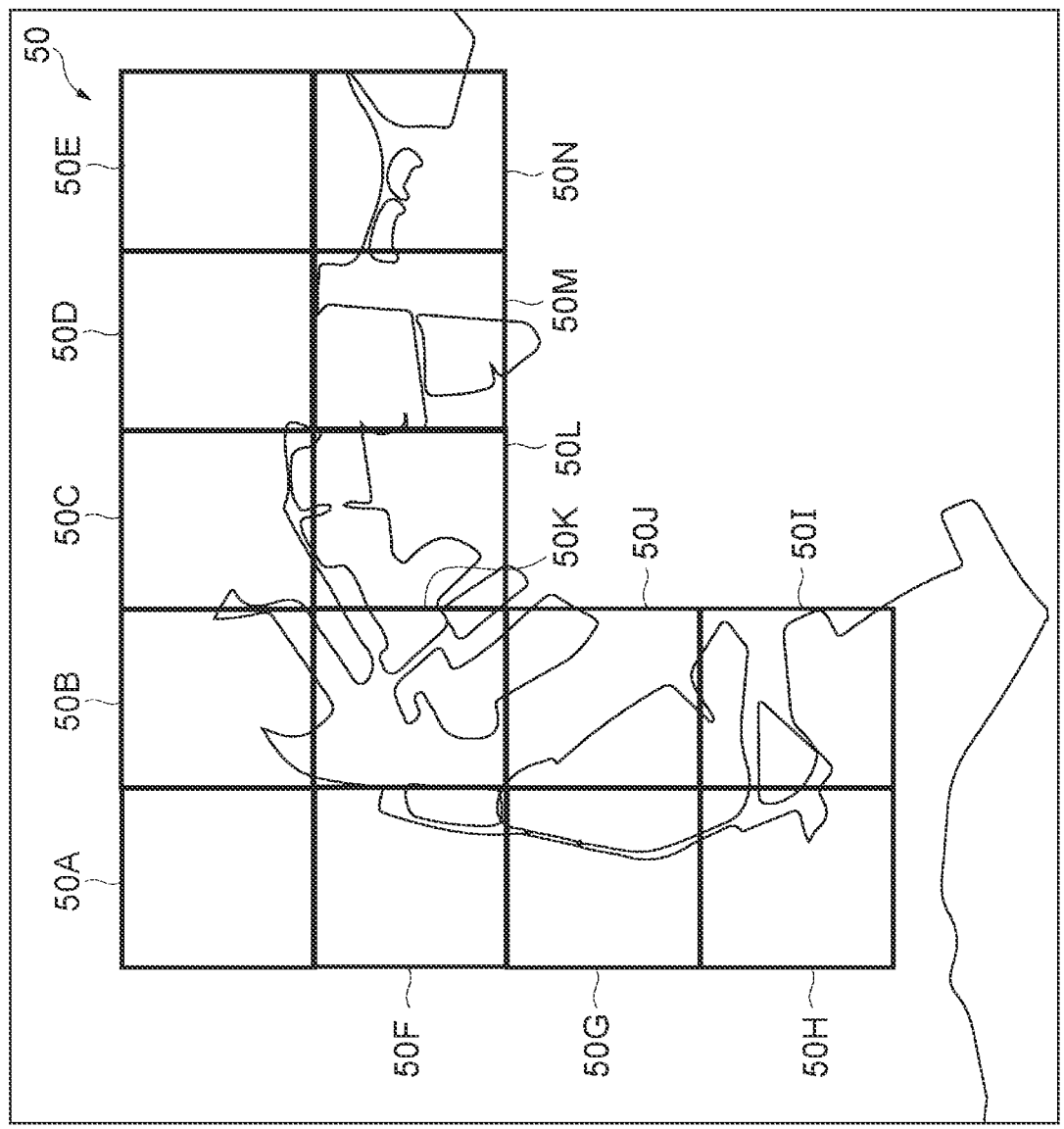
FIG. 8 is a diagram showing an example of the mesh set on a map.

FIG. 8 is a diagram showing an example of the mesh 50 set on a map. As shown in FIG. 8, the mesh 50 may include a plurality of meshes 50A to 50N. The mesh 50 may be a single mesh.

The shapes of the meshes 50A to 50N are square as an example. The meshes 50A to 50N may have a rectangular shape, a circular shape, an elliptical shape, or a polygonal shape such as a hexagonal shape. The shapes of the meshes 50A to 50N are not particularly limited. The sizes of the meshes 50A to 50N are not particularly limited. Each of the meshes 50A to 50N may be set as an area having a size of 30 m square on the map or an area having a size of 1 km square on the map.

The meshes 50A to 50N may overlap each other or may be spaced away from each other. The arrangement of the meshes 50A to 50N is not particularly limited and any arrangement may be adopted. The meshes 50A to 50N may be arranged in a grid pattern, or may be set based on nodes, intersections, traffic lights, and various landmarks on the map. The meshes 50A to 50N may be set as sections on a road with a predetermined distance.

The predetermined period to be used by the occurrence counting unit 11e may be one hour, three hours, or six hours. The predetermined period may be one day, three days, or one week. The predetermined period is not particularly limited. When the mesh 50 is associated with the vehicle assistance content described later, the predetermined period may be determined for each mesh 50 based on the vehicle assistance content.

FIG. 9 is a diagram for explaining the occurrence count of the unstable behavior positions D in the mesh 50A. In the situation shown in FIG. 9, the occurrence counting unit 11e measures "3" as the occurrence count of the unstable behavior positions D in the mesh 50A.

The mesh enlarging unit 11f enlarges the mesh 50 to include the unstable behavior positions counted by the occurrence counting unit 11e within the predetermined period with the occurrence count equal to or larger than a first threshold. The first threshold is not particularly limited. The first threshold may be 5, 10, 11, or more. The first threshold may be 50 or 100.

The enlargement of the mesh 50 may be performed as a quantitative area increase or as an area increase at a predetermined ratio with respect to the area before the enlargement. The mesh 50 may be enlarged outward with respect to a current center position of the mesh 50 or may be enlarged to extend along a main road within the mesh 50. The method for enlarging the mesh 50 is not particularly limited.

FIG. 10 is a diagram for explaining enlargement of the mesh 50A. FIG. 10 shows a situation in which the mesh 50A is enlarged from the situation shown in FIG. 9. In the situation shown in FIG. 9, the number of unstable behavior positions D counted by the occurrence counting unit 11e in the mesh 50A is smaller than a predetermined threshold (for example, 5). Therefore, the mesh enlarging unit 11f enlarges the mesh 50A so that the number of unstable behavior positions D reaches a value equal to or larger than the predetermined threshold. In FIG. 10, the mesh enlarging unit 11f terminates the enlargement of the mesh 50A because the number of unstable behavior positions D in the mesh 50A is equal to or larger than the predetermined threshold.

The mesh enlarging unit 11f may enlarge each of the meshes 50A to 50N to include the unstable behavior positions within the predetermined period with the occurrence count equal to or larger than the first threshold. The mesh enlarging unit 11f may target only a mesh including at least one unstable behavior position D among the meshes 50A to 50N, and enlarge the mesh to include the unstable behavior positions within the predetermined period with the occurrence count equal to or larger than the first threshold. The mesh enlarging unit 11f may target only a mesh including a predetermined number of unstable behavior positions D or more among the meshes 50A to 50N.

The mesh enlarging unit 11f terminates the enlargement of the mesh when the mesh is enlarged to a predetermined upper limit while the occurrence count of the included unstable behavior positions within the predetermined period is not equal to or larger than the first threshold. The upper limit can be set to any value. The upper limit may be the area or the number of enlargements.

The mesh enlarging unit 11f may divide the mesh when a preset mesh division condition is satisfied. For example, the mesh enlarging unit 11f measures an intermittent operation count in each mesh for use in the determination about the mesh division condition.

The intermittent operation count is the number of occurrences of an intermittent operation corresponding to a plurality of unstable behaviors of the same target vehicle 2 during the same trip in the mesh. The mesh enlarging unit 11f measures the intermittent operation count based on the target vehicle data, the unstable behavior positions, and the mesh. The intermittent operation count does not include a case where the target vehicle 2 is the same but is traveling in a different direction. When measuring the intermittent operation count, a case where the same target vehicle 2 has slipped three times in the same mesh and a case where the same target vehicle 2 has slipped five times in the same mesh are each counted as one intermittent operation.

The mesh enlarging unit 11f determines that the mesh division condition is satisfied when the intermittent operation count in the mesh is equal to or larger than an intermittent operation count threshold and a distance between a plurality of unstable behaviors in the intermittent operation of the same target vehicle 2 is equal to or longer than a predetermined distance. The distance between the unstable behaviors in the intermittent operation is a distance between the positions of occurrence of the unstable behaviors counted into the intermittent operation count in the mesh.

For example, the mesh enlarging unit 11f divides the mesh to include each of the positions of occurrence of the unstable behaviors spaced away by the predetermined distance or longer in the intermittent operation. The size of the mesh (mesh size) is reduced by the division. The mesh enlarging unit 11f may divide the mesh into equal parts at the center, or may divide the mesh so that the numbers of the unstable behavior positions are equal to each other based on distribution of the unstable behavior positions. The method for dividing the mesh is not particularly limited. When the intermittent operation count in the mesh is large and the distance between the unstable behaviors in the intermittent operation of the same target vehicle 2 is equal to or longer than the predetermined distance, there is a possibility that the unstable behaviors have occurred due to different causes. By dividing the mesh, it is possible to realize vehicle assistance for each cause of the unstable behavior.

The reproduction frequency measuring unit 11g measures a reproduction frequency of the unstable behavior in a reproduction frequency measurement area based on the unstable behavior position recognized by the unstable behavior position recognition unit 11b. The reproduction frequency measurement area is a preset area including at least one mesh. The reproduction frequency measurement area may be set based on a region of a local government such as a prefecture or a municipality. The reproduction frequency measurement area may be an area including the meshes 50A to 50N in FIG. 8 (for example, an area in which the meshes 50A to 50N are integrated).

The reproduction frequency measurement area may be set as an independent area regardless of the enlargement of the mesh, or the area may be enlarged in conjunction with the enlargement of the mesh to include the original mesh. The reproduction frequency measurement area may be set as the same area as one mesh. In this case, the mesh can be used directly as the reproduction frequency measurement area. The reproduction frequency measurement area is preset in association with the map in, for example, the map database 15 or the storage database 16.

The reproduction frequency is a reproduction count of the unstable behavior in a predetermined investigation period. The predetermined period is not particularly limited. The predetermined period may be one day, one week, or one month. The reproduction count corresponds to, for example, Scene 1 determined by the situation determination unit 11c.

When the reproduction frequency measuring unit 11g does not detect a sufficient number of Scenes 1 to measure the reproduction frequency, the reproduction frequency measuring unit 11g secures the number of Scenes 1 by setting the investigation period to a longer period (for example, a period that is 0.5 months longer). The reproduction frequency measuring unit 11g repeats the extension of the investigation period until a sufficient number of unstable behavior positions are collected. The sufficient number is, for example, a number equal to or larger than a preset threshold.

When a sufficient number of Scenes 1 are not detected though the investigation period exceeds a preset upper limit, the reproduction frequency measuring unit 11g does not set the remaining period because of an unprovidable period. The reproduction frequency measuring unit 11g may measure the reproduction frequency by using a simply repeated count of the unstable behavior position as the reproduction count instead of Scene 1.

The reproduction frequency measuring unit 11g determines, as a reproduced point, an unstable behavior position whose reproduction frequency is equal to or higher than a reproduction frequency threshold. The reproduction frequency measuring unit 11g determines, as an unreproduced point, an unstable behavior position whose reproduction frequency is lower than the reproduction frequency threshold. The reproduction frequency measuring unit 11g may determine, as the reproduced point, an unstable behavior position whose reproduction count is equal to or larger than a reproduction count threshold instead of the reproduction frequency.

The remaining period setting unit 11h sets the remaining period of the unstable behavior position in the mesh. The remaining period is the remainder of a period in which the unstable behavior position is used for vehicle assistance. The remaining period setting unit 11h sets the remaining period of the unstable behavior position in the reproduction frequency measurement area based on the reproduction frequency of the unstable behavior measured by the reproduction frequency measuring unit 11g in the reproduction frequency measurement area.

The remaining period setting unit 11h measures, for example, a duration in which the reproduction frequency in the reproduction frequency measurement area continues to be equal to or higher than the predetermined threshold. When an average value of the duration is, for example, three hours, the remaining period of the unstable behavior position in the reproduction frequency measurement area is set to three hours. A median value may be used instead of the average value of the duration, or the remaining period may be determined based on the duration by using a predetermined arithmetic expression.

The remaining period setting unit 11h may set the remaining period of the unstable behavior position to a longer period as the reproduction frequency of the unstable behavior increases. When the reproduction frequency of the unstable behavior is equal to or higher than the predetermined threshold, the remaining period setting unit 11h may set the remaining period of the unstable behavior position in the reproduction frequency measurement area to a longer period as compared with a case where the reproduction frequency of the unstable behavior is lower than the predetermined threshold. The remaining period setting unit 11h may set the remaining period stepwise by using a plurality of thresholds. The remaining period setting unit 11h may extend or shorten the remaining period when the value of the reproduction frequency changes by new measurement.

The storage processor 11j stores, in the storage database 16, the unstable behavior position information related to the unstable behavior position recognized by the unstable behavior position recognition unit 11b. The storage processor 11j stores, in the storage database 16, the mesh stored in the map database 15 and the unstable behavior position in the mesh in association with each other. When the mesh enlargement process is performed by the mesh enlarging unit 11f, the storage processor 11j updates the storage database 16 by associating the enlarged mesh with the unstable behavior position in the mesh. The storage processor 11j may also update the map database 15 for the enlarged mesh.

When the determination is made by the situation determination unit 11c, the storage processor 11j may store the unstable behavior position and a determination result from the situation determination unit 11c in the storage database 16 in association with each other. The storage processor 11j may store, in the storage database 16, the unstable traveling data and the stable traveling data acquired by the traveling data acquisition unit 11d in association with the unstable behavior position.

The storage processor 11j may store, in the storage database 16, the remaining period of the unstable behavior position that is set by the remaining period setting unit 11h. The storage processor 11j may delete, from the storage database 16, the information on the unstable behavior position whose remaining period has elapsed. It is not essential to delete the information on the unstable behavior position after the elapse of the remaining period.

The vehicle assistant unit 11k provides various types of assistance to the target vehicle 2 by an information notification or an instruction. The vehicle assistant unit 11k provides various types of assistance to the target vehicle 2 via the communicator 13. The vehicle assistant unit 11k executes vehicle assistance such as a notification about the unstable behavior position, an instruction to change the traveling path of the target vehicle 2, or an instruction to cancel the autonomous driving of the target vehicle 2 during the autonomous driving. The vehicle assistance content (service content) is not particularly limited.

The vehicle assistant unit 11k determines whether any target vehicle 2 is traveling toward the mesh including the unstable behavior position, for example, based on the target vehicle data recognized by the target vehicle data acquisition unit 11a and the stored contents in the storage database 16. The vehicle assistant unit 11k may determine that an unstable behavior position with no remaining period does not exist. In this case, it is not necessary to delete the unstable behavior position with no remaining period from the storage database 16.

For example, the vehicle assistant unit 11k determines that any target vehicle 2 is traveling toward the mesh when the mesh is present ahead of the target vehicle 2 and the distance between the mesh and the target vehicle 2 is shorter than a threshold. The determination may be made by using an arrival time instead of the distance. When the vehicle assistant unit 11k has acquired information on the traveling route of the target vehicle 2 and the traveling route passes through the mesh, the vehicle assistant unit 11k may determine that the target vehicle 2 is traveling toward the mesh. The vehicle assistant unit 11k may make the above determination by a predetermined method.

When the vehicle assistant unit 11k determines that any target vehicle 2 is traveling toward the mesh including the unstable behavior position, the vehicle assistant unit 11k executes vehicle assistance related to the mesh for the target vehicle 2. For example, the vehicle assistant unit 11k notifies the target vehicle 2 about information on the unstable behavior position associated with the mesh. The target vehicle 2 notifies the driver about the information on the unstable behavior position by image output such as text display and/or audio output by the HMI 27. The target vehicle 2 need not notify the driver. When the target vehicle 2 is executing autonomous driving, the vehicle may be decelerated or steered to avoid the unstable behavior without notifying the driver.

The vehicle assistant unit 11k may provide vehicle assistance only when determination is made that any target vehicle 2 is traveling toward the mesh including the unstable behavior position in the successive occurrence situation. When determination is made that any target vehicle 2 is traveling toward the mesh including only the unstable behavior position in the unsuccessive occurrence situation, the vehicle assistant unit 11k need not provide vehicle assistance under the assumption that the target vehicle 2 is unlikely to exhibit the unstable behavior.

Alternatively, the vehicle assistant unit 11k may change the vehicle assistance content based on the ratio of the unstable behavior position in the successive occurrence situation and the unstable behavior position in the unsuccessive occurrence situation in the mesh. For example, when the ratio of the unstable behavior position in the successive occurrence situation is higher, the vehicle assistant unit 11k may instruct the target vehicle 2 to change the traveling path to avoid the unstable behavior position. When the ratio of the unstable behavior position in the unsuccessive occurrence situation is higher, the vehicle assistant unit 11k may only notify the target vehicle 2 about the unstable behavior position information.

Determination may be made as to whether the situation is the successive occurrence situation or the unsuccessive occurrence situation for each mesh rather than for each unstable behavior position. The situation determination unit 11c may determine that the mesh is in the successive occurrence situation when the number of unstable behavior positions in the successive occurrence situation in the mesh is equal to or larger than a predetermined threshold. The situation determination unit 11c may determine that the mesh is in the successive occurrence situation when the ratio of the unstable behavior position in the successive occurrence situation is higher.

When the target vehicle 2 is executing autonomous driving and determination is made that the mesh toward which the target vehicle 2 is traveling is in the successive occurrence situation, the vehicle assistant unit 11k may notify the target vehicle 2 about the unstable behavior position information and instruct the target vehicle 2 to cancel the autonomous driving at the unstable behavior position. By canceling the autonomous driving and making transition to the manual driving by the driver, it is possible to avoid a situation in which the target vehicle 2 exhibits the unstable behavior in the mesh while executing the autonomous driving.

When determination is made that any target vehicle 2 is traveling toward the mesh in the unsuccessive occurrence situation, the vehicle assistant unit 11k may notify the target vehicle 2 about the unstable behavior position information related to the mesh and about past stable traveling data on traveling conditions of a target vehicle 2 that did not exhibit the unstable behavior at the unstable behavior position in the mesh. The target vehicle 2 can suppress the unstable behavior by referring to the stable traveling data.

The vehicle assistant unit 11k may notify the target vehicle 2 about the unstable behavior position information when determination is made that the mesh is in the successive occurrence situation, and need not notify the target vehicle 2 about the unstable behavior position information when determination is made that the mesh is in the unsuccessive occurrence situation. As a result, it is possible to reduce an unnecessary notification of the unstable behavior position information when the reproducibility of the unstable behavior is not high.

The vehicle assistant unit 11k may notify the target vehicle 2 about the unstable behavior position information and past stable traveling data on traveling conditions of a target vehicle 2 that did not exhibit the unstable behavior at the unstable behavior position. Instead of the notification of the stable traveling data, the vehicle assistant unit 11k may give an instruction (stable traveling instruction) to the target vehicle 2 so that the traveling conditions of the target vehicle 2 approach traveling conditions in the stable traveling data.

In this case, the information processing server 10 can reduce the occurrence of the unstable behavior in the mesh such that the traveling conditions of the target vehicle 2 approach the traveling conditions in the stable traveling data by the instruction.

The vehicle assistant unit 11k may change the vehicle assistance content depending on the area of the mesh. The vehicle assistant unit 11k may reduce the assistance level of the vehicle assistance as the area of the mesh increases. The density of the unstable behavior positions in the mesh may be lower as the area of the mesh is enlarged by the enlargement process. For example, the assistance level of the vehicle assistance is highest in a case of an instruction to change traveling conditions (vehicle control instruction), such as a deceleration instruction for the target vehicle 2, second highest in a case of a notification by text display and audio output (alert), and lowest in a case of a notification by text display alone (information provision).

Specifically, the vehicle assistant unit 11k may change the assistance level of the vehicle assistance while dividing the area of the mesh into three stages. The vehicle assistant unit 11k may give a notification of the unstable behavior position by text display (information provision) to a target vehicle 2 traveling toward a mesh in a first stage with the largest area, a notification of the unstable behavior position by text display and audio output (alert) to a target vehicle 2 traveling toward a mesh in a second stage with a medium area, and an instruction to change traveling conditions (vehicle control instruction), such as a deceleration instruction, to a target vehicle 2 traveling toward a mesh in a third stage with the smallest area. When giving a warning instruction, an alert may be issued by text display and audio output in combination. The vehicle assistance content may be changed by using the number of mesh enlargement processes instead of the area of the mesh.

Program

A program causes the processor 11 of the information processing server 10 to function (operate) as the target vehicle data acquisition unit 11a, the unstable behavior position recognition unit 11b, the situation determination unit 11c, the traveling data acquisition unit 11d, the occurrence counting unit 11e, the mesh enlarging unit 11f, the reproduction frequency measuring unit 11g, the remaining period setting unit 11h, the storage processor 11j, and the vehicle assistant unit 11k. The program is provided by a non-transitory recording medium such as a ROM or a semiconductor memory. The program may also be provided by communication via a network or the like.

Processing Method for Information Processing Server

Next, a processing method for the information processing server 10 according to the present embodiment will be described with reference to the drawings. FIG. 11 is a flowchart showing an example of a storage process for unstable behavior position information. The storage process for unstable behavior information may be executed every time target vehicle data is transmitted from the target vehicle 2, or may collectively be made based on a plurality of pieces of target vehicle data at regular intervals.

In S10 shown in FIG. 11, the information processing server 10 causes the target vehicle data acquisition unit 11a to recognize the target vehicle data (target vehicle data recognition step). The target vehicle data acquisition unit 11a recognizes the target vehicle data transmitted from the target vehicle 2. The target vehicle data includes position information of the target vehicle 2 on a map and traveling conditions of the target vehicle 2. Then, the information processing server 10 proceeds to S12.

In S12, the information processing server 10 causes the unstable behavior position recognition unit 11b to determine whether the target vehicle 2 has exhibited unstable behavior (unstable behavior determination step). The unstable behavior position recognition unit 11b determines whether the target vehicle 2 has exhibited the unstable behavior based on the target vehicle data. The unstable behavior position recognition unit 11b determines the presence or absence of the unstable behavior by, for example, determining whether the target vehicle 2 has slipped as the unstable behavior based on a wheel speed of each wheel of the target vehicle 2. When determination is not made that the target vehicle 2 has exhibited the unstable behavior (S12: NO), the information processing server 10 terminates the current storage process for the unstable behavior position information. When determination is made that the target vehicle 2 has exhibited the unstable behavior (S12: YES), the information processing server 10 proceeds to S14.

In S14, the information processing server 10 causes the unstable behavior position recognition unit 11b to recognize an unstable behavior position (unstable behavior position recognition step). The unstable behavior position recognition unit 11b recognizes the unstable behavior position based on position information of the target vehicle 2 on the map when determination is made that the target vehicle 2 has exhibited the unstable behavior. Then, the information processing server 10 proceeds to S16.

In S16, the information processing server 10 causes the traveling data acquisition unit 11d to acquire unstable traveling data (traveling data acquisition step). The traveling data acquisition 11d acquires, based on the target vehicle data recognized by the target vehicle data acquisition unit 11a, unstable traveling data related to traveling conditions of the target vehicle 2 that has exhibited the unstable behavior at the unstable behavior position. Then, the information processing server 10 proceeds to S18.

In S18, the information processing server 10 causes the storage processor 11j to store the unstable behavior position (storage process step). The storage processor 11j stores, in the storage database 16, a mesh and the unstable behavior position in the mesh in association with each other. Then, the information processing server 10 terminates the current storage process for the unstable behavior position information.

FIG. 12A is a flowchart showing an example of a successive occurrence situation determination process. The successive occurrence situation determination process is executed, for example, when the unstable behavior position information is stored in the storage database 16.

In S20 shown in FIG. 12A, the information processing server 10 causes the situation determination unit 11c to determine whether the target vehicle 2 has passed through the unstable behavior position (unstable behavior position passage determination step). For example, the situation determination unit 11c determines whether the target vehicle 2 has passed through the unstable behavior position based on the target vehicle data recognized by the target vehicle data acquisition unit 11a and the unstable behavior position recognized by the unstable behavior position recognition unit 11b. When determination is made that the target vehicle 2 has passed through the unstable behavior position (S20: YES), the information processing server 10 proceeds to S22. When determination is not made that the target vehicle 2 has passed through the unstable behavior position (S20: NO), the information processing server 10 terminates the current successive occurrence situation determination process.

In S22, the information processing server 10 causes the situation determination unit 11c to determine whether the unstable behavior position is in the successive occurrence situation or in the unsuccessive occurrence situation (determination step). The situation determination unit 11c determines whether the unstable behavior position recognized by the unstable behavior position recognition unit 11b is in the successive occurrence situation or in the unsuccessive occurrence situation based on whether a plurality of target vehicles 2 has exhibited the unstable behavior at the unstable behavior position. When determination is made that the unstable behavior position is in the successive occurrence situation (S22: YES), the information processing server 10 proceeds to S24. When determination is made that the unstable behavior position is in the unsuccessive occurrence situation (S22: NO), the information processing server 10 proceeds to S26.

In S24, the information processing server 10 causes the traveling data acquisition unit 11d to acquire unstable traveling data (first traveling data acquisition step). The traveling data acquisition unit 11d acquires, based on the target vehicle data, unstable traveling data related to traveling conditions of the target vehicle 2 that has exhibited the unstable behavior at the unstable behavior position. Then, the information processing server 10 proceeds to S28.

In S26, the information processing server 10 causes the traveling data acquisition unit 11d to acquire unstable traveling data or stable traveling data (second traveling data acquisition step). The traveling data acquisition unit 11d acquires, based on the target vehicle data, unstable traveling data related to traveling conditions of the target vehicle 2 that has exhibited the unstable behavior at the unstable behavior position or stable traveling data related to traveling conditions of the target vehicle 2 that has passed through the unstable behavior position in the unsuccessive occurrence situation without exhibiting the unstable behavior. Then, the information processing server 10 proceeds to S28.

In S28, the information processing server 10 causes the storage processor 11j to execute a storage process (storage process step). The storage processor 11j stores, in the storage database 16, the unstable behavior position recognized by the unstable behavior position recognition unit 11b and the determination result from the situation determination unit 11c for the unstable behavior position in association with each other. The storage processor 11j stores the unstable behavior position and the unstable traveling data or the stable traveling data in the storage database 16 in association with each other. Then, the information processing server 10 terminates the current successive occurrence situation determination process.

FIG. 12B is a flowchart showing an example of a target vehicle assistance process. The target vehicle assistance process is executed when a target vehicle 2 to be assisted is traveling.

In S30 shown in FIG. 12B, the information processing server 10 causes the vehicle assistant unit 11k to determine whether any target vehicle 2 is traveling toward the mesh including the unstable behavior position (target vehicle determination step). The vehicle assistant unit 11k makes the above determination based on the target vehicle data recognized by the target vehicle data acquisition unit 11a and the mesh associated with the unstable behavior position in the storage database 16.

When determination is made that any target vehicle 2 is traveling toward the mesh including the unstable behavior position (S30: YES), the information processing server 10 proceeds to S32. When determination is not made that any target vehicle 2 is traveling toward the mesh including the unstable behavior position (S30: NO), the information processing server 10 terminates the current target vehicle assistance process.

In S32, the information processing server 10 causes the vehicle assistant unit 11$k$ to provide vehicle assistance based on the area of the mesh (vehicle assistance step). The vehicle assistant unit 11$k$ executes the vehicle assistance for the target vehicle 2 at an assistance level associated with the area of the mesh. For example, the vehicle assistant unit 11$k$ provides vehicle assistance selected from among vehicle control instruction, alert, and information provision based on the area of the mesh. Then, the information processing server 10 terminates the current target vehicle assistance process.

Figure 13B:
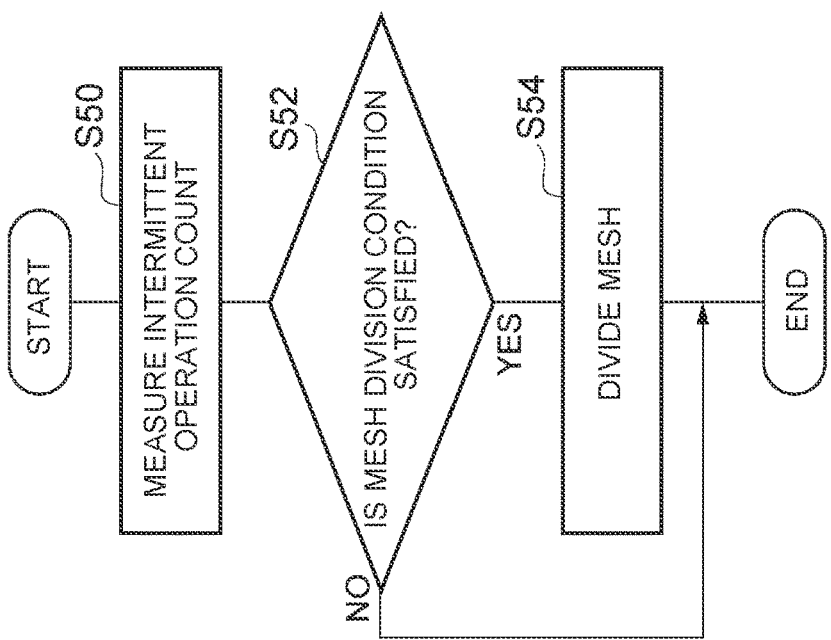
FIG. 13B is a flowchart showing an example of a mesh division process.
Figure 13A:
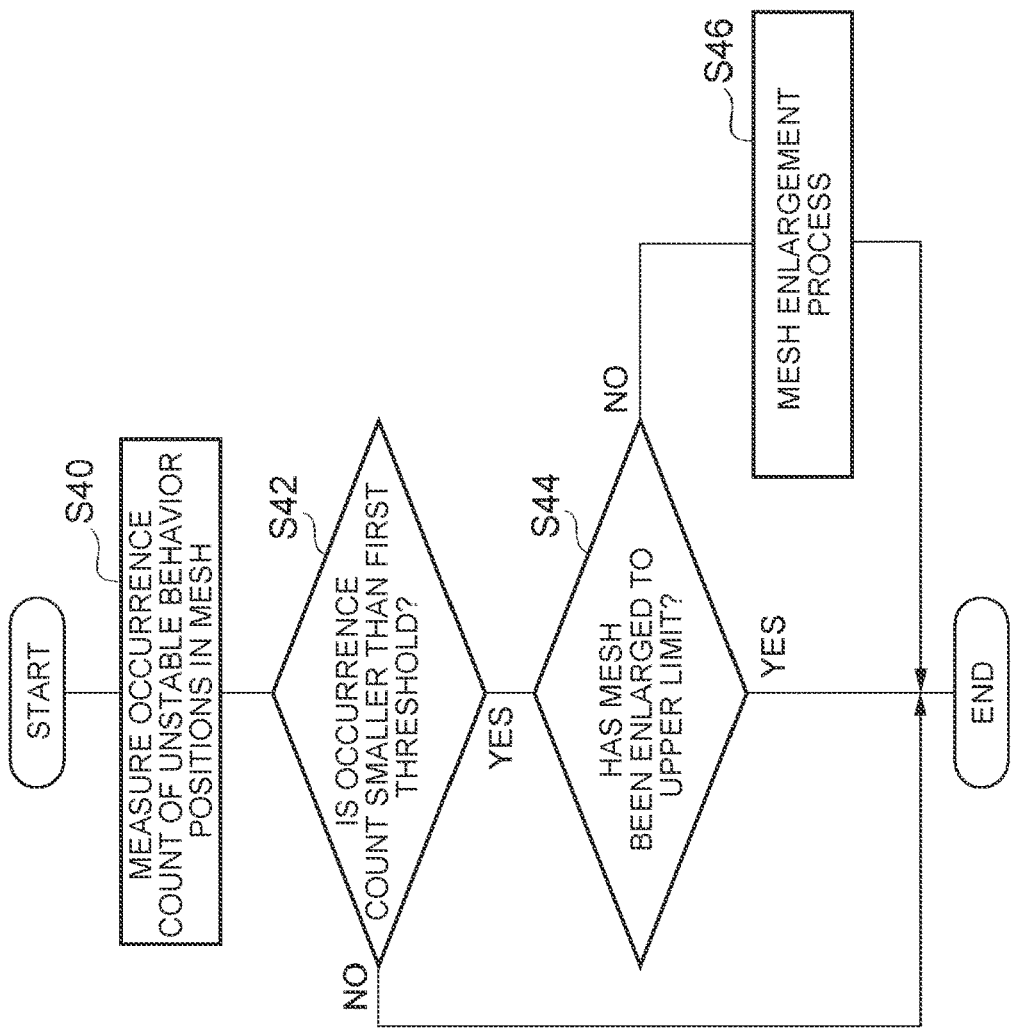
FIG. 13A is a flowchart showing an example of a mesh enlargement process.

FIG. 13A is a flowchart showing an example of a mesh enlargement process. For example, the mesh enlargement process is executed for each mesh (for example, the meshes 50A to 50N) at regular intervals. Hereinafter, the mesh 50A will be described as an example.

In S40 shown in FIG. 13A, the information processing server 10 causes the occurrence counting unit 11$e$ to measure an occurrence count of unstable behavior positions within the predetermined period in the mesh 50A (occurrence count measuring step). The occurrence counting unit 11$e$ measures the occurrence count based on information on the mesh 50A on the map stored in the map database 15 and the unstable behavior position recognized by the unstable behavior position recognition unit 11$b$.

In S42, the information processing server 10 causes the mesh enlarging unit 11$f$ to determine whether the occurrence count of the unstable behavior positions within the predetermined period in the mesh 50A is smaller than the first threshold (occurrence count determination step). When determination is made that the occurrence count of the unstable behavior positions is smaller than the first threshold (S42: YES), the information processing server 10 proceeds to S44. When determination is not made that the occurrence count of the unstable behavior positions is smaller than the first threshold (S42: NO), the information processing server 10 terminates the current mesh enlargement process.

In S44, the information processing server 10 causes the mesh enlarging unit 11$f$ to determine whether the mesh 50A has been enlarged to the upper limit (upper limit determination step). When determination is made that the mesh 50A has been enlarged to the upper limit (S44: YES), the information processing server 10 terminates the current mesh enlargement process. When determination is not made that the mesh 50A has been enlarged to the upper limit (S44: NO), the information processing server 10 proceeds to S46.

In S46, the information processing server 10 causes the mesh enlarging unit 11$f$ to enlarge the mesh (mesh enlargement step). For example, the mesh enlarging unit 11$f$ enlarges the mesh 50A outward with respect to the center position of the mesh 50A. Then, the information processing server 10 terminates the current mesh enlargement process.

FIG. 13B is a flowchart showing an example of a mesh division process. For example, the mesh division process is executed for each mesh (for example, the meshes 50A to 50N) at regular intervals. Hereinafter, the mesh 50A will be described as an example.

In S50 shown in FIG. 13B, the information processing server 10 causes the mesh enlarging unit 11$f$ to measure an intermittent operation count in the mesh 50A (intermittent operation count measuring step). The mesh enlarging unit 11$f$ measures the intermittent operation count based on the target vehicle data, the unstable behavior positions, and the mesh.

In S52, the information processing server 10 causes the mesh enlarging unit 11$f$ to determine whether the mesh division condition is satisfied (division condition determination step). The mesh enlarging unit 11$f$ determines that the mesh division condition is satisfied when the intermittent operation count in the mesh is equal to or larger than the intermittent operation count threshold and a distance between a plurality of unstable behaviors in the intermittent operation of the same target vehicle 2 is equal to or longer than the predetermined distance. When determination is made that the mesh division condition is satisfied (S52: YES), the information processing server 10 proceeds to S54. When determination is not made that the mesh division condition is satisfied (S52: NO), the information processing server 10 terminates the current mesh division process.

In S54, the information processing server 10 causes the mesh enlarging unit 11$f$ to divide the mesh (mesh division step). For example, the mesh enlarging unit 11$f$ divides the mesh to include each of the positions of occurrence of the unstable behaviors spaced away by the predetermined distance or longer in the intermittent operation. Then, the information processing server 10 terminates the current mesh division process.

Figure 14A:
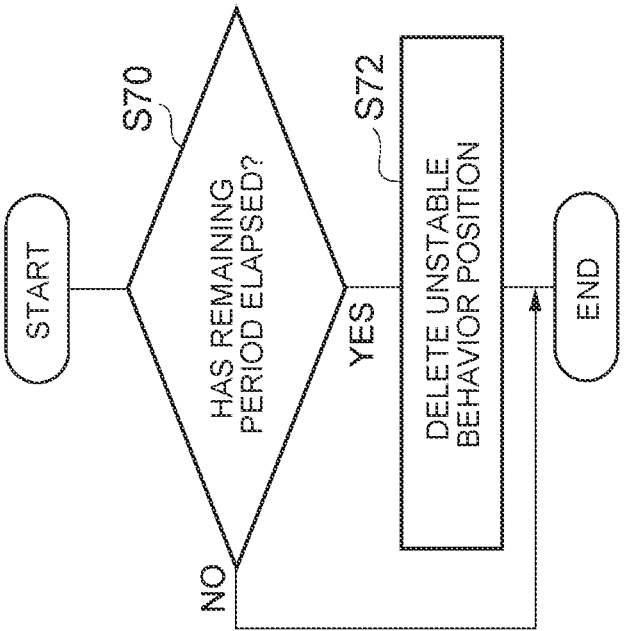
FIG. 14A is a flowchart showing an example of a remaining period setting process.

FIG. 14A is a flowchart showing an example of a remaining period setting process. The remaining period setting process is executed, for example, at regular intervals.

In S60 shown in FIG. 14A, the information processing server 10 causes the remaining period setting unit 11$h$ to measure a reproduction frequency of the unstable behavior in the reproduction frequency measurement area (reproduction frequency measurement step). The remaining period setting unit 11$h$ measures the reproduction frequency of the unstable behavior in the reproduction frequency measurement area based on the reproduction frequency measurement area preset on the map and the unstable behavior position recognized by the unstable behavior position recognition unit 11$b$.

In S62, the information processing server 10 causes the remaining period setting unit 11$h$ to set the remaining period of the unstable behavior position (remaining period setting step). The remaining period setting unit 11$h$ sets the remaining period of the unstable behavior position in the reproduction frequency measurement area based on the reproduction frequency of the unstable behavior in the reproduction frequency measurement area.

Figure 14B:
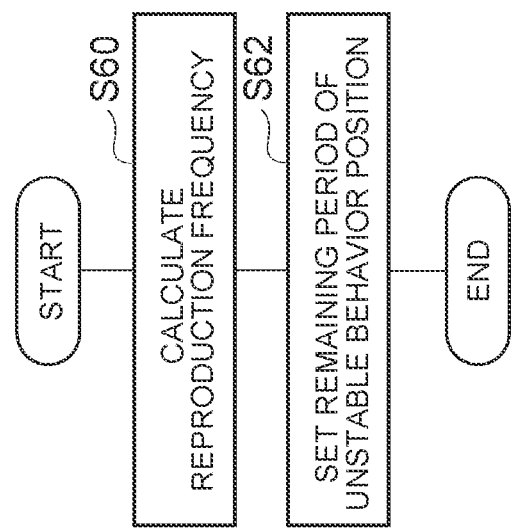
FIG. 14B is a flowchart showing an example of a remaining period elapse process.

FIG. 14B is a flowchart showing an example of a remaining period elapse process. The remaining period elapse process is executed for each unstable behavior position having the remaining period. The remaining period elapse process is executed, for example, at regular intervals.

In S70 shown in FIG. 14B, the information processing server 10 causes the storage processor 11$j$ to determine whether the remaining period of the unstable behavior position has elapsed (remaining period elapse determination step). The storage processor 11$j$ makes the above determination based on the remaining period set by the remaining period setting unit 11$h$ and an elapse of time. When determination is made that the remaining period of the unstable behavior position has elapsed (S70: YES), the information processing server 10 proceeds to S72. When determination is not made that the remaining period of the unstable behavior position has elapsed (S70: NO), the information processing server 10 terminates the current remaining period elapse process.

In S72, the information processing server 10 causes the storage processor 11j to delete, from the storage database 16, the unstable behavior position whose remaining period has elapsed. The storage processor 11j need not delete the unstable behavior position, and may simply store the elapse of the remaining period in the storage database 16 in association with the unstable behavior position. Then, the information processing server 10 terminates the current remaining period elapse process.

According to the information processing server 10 (and the processing method and the program for the information processing server 10) of the first embodiment described above, the mesh preset on the map is enlarged to include the unstable behavior positions within the predetermined period in the mesh with the occurrence count equal to or larger than the first threshold, and the mesh and the unstable behavior positions in the mesh are stored in the storage database 16 in association with each other. Thus, the information on the unstable behavior positions can appropriately be managed in association with the mesh on the map. In the information processing server 10, it is possible to avoid repeatedly enlarging a less necessary mesh by determining the upper limit of the mesh enlargement.

According to the information processing server 10, the density of the unstable behavior positions in the mesh may decrease as the mesh is enlarged by the mesh enlarging unit 11f. Therefore, when any target vehicle 2 is traveling toward the mesh including the unstable behavior positions, the vehicle assistance content for the target vehicle can appropriately be changed depending on the size of the mesh.

According to the information processing server 10, there is a possibility that a plurality of unstable behaviors has occurred in the same target vehicle due to different causes in a mesh where the intermittent operation count is equal to or larger than the intermittent operation count threshold and the distance between the unstable behaviors in the intermittent operation of the same target vehicle is equal to or longer than the predetermined distance. Therefore, appropriate management can be achieved by dividing the mesh.

According to the information processing server 10, the remaining period of the unstable behavior position is set based on the reproduction frequency of the unstable behavior in the reproduction frequency measurement area, and the assistance is not provided for the unstable behavior position whose remaining period has elapsed. Thus, it is possible to reduce execution of less necessary vehicle assistance.

According to the information processing server 10, the mesh is enlarged by using, as the occurrence count of the unstable behavior positions, the determination count of the successive occurrence situations of the unstable behavior positions within the predetermined period. Thus, the mesh can appropriately be enlarged so that the determination count of the successive occurrence situations with high reproducibility reaches a value equal to or larger than the first threshold.

Second Embodiment

Figure 15:
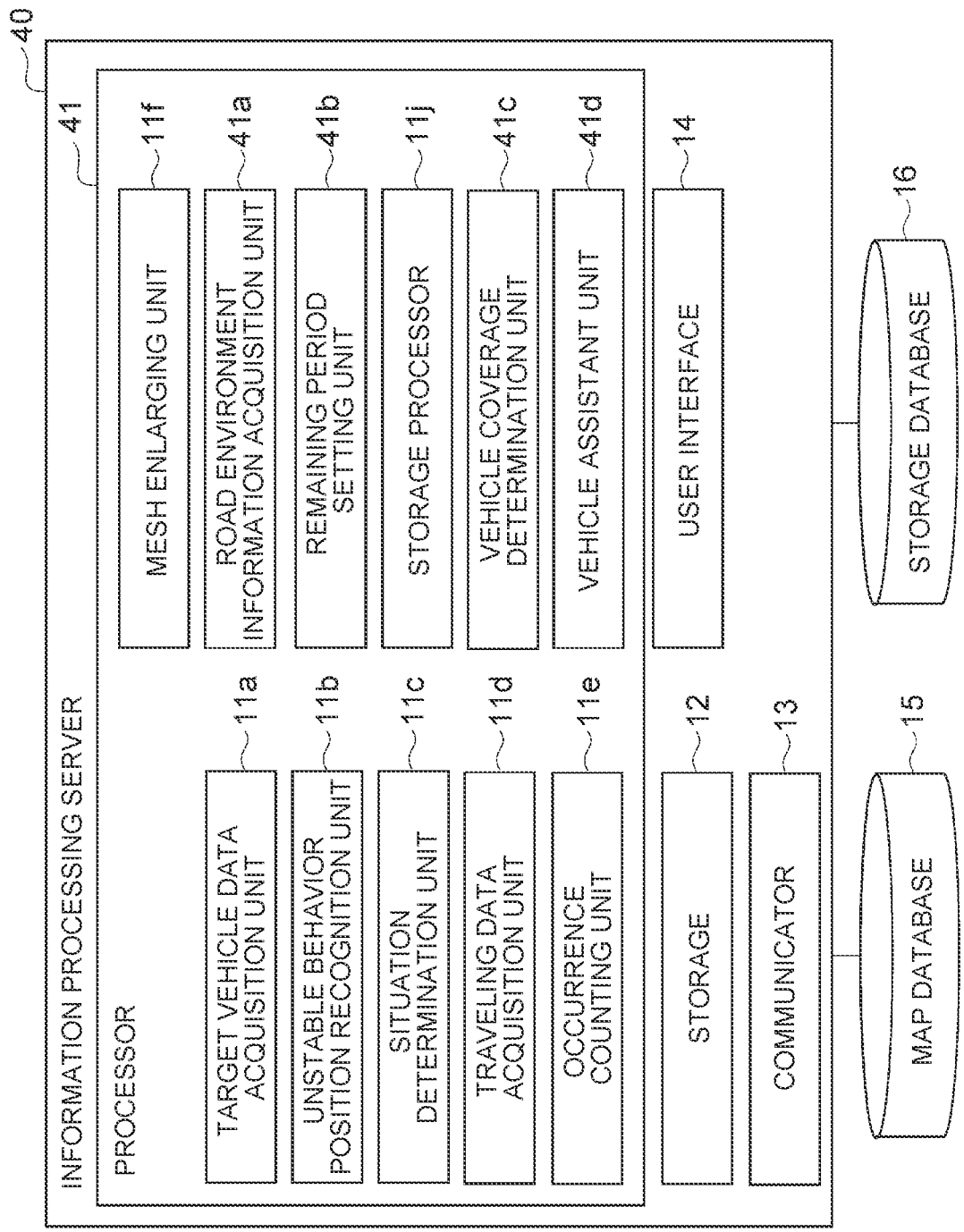
FIG. 15 is a block diagram showing an example of the configuration of an information processing server according to a second embodiment.

Next, an information processing server according to a second embodiment will be described with reference to FIG. 15. FIG. 15 is a block diagram showing an example of the configuration of the information processing server according to the second embodiment.

Configuration of Information Processing Server of Second Embodiment

A processor 41 of an information processing server 40 shown in FIG. 15 differs from the processor in the first embodiment in that the processor 41 includes a road environment information acquisition unit 41a and a vehicle coverage determination unit 41c, and in terms of functions of a remaining period setting unit 41b and a vehicle assistant unit 41d.

Specifically, the road environment information acquisition unit 41a acquires road environment information associated with a map, for example, by communication. The road environment information includes at least weather forecast information. The weather forecast information includes weather and climate forecast information associated with the map. The weather forecast information may include information on torrential rains and typhoons. The weather forecast information can be acquired from, for example, a server of a government agency that manages climate information.

The road environment information may include road construction information or traffic congestion information. The road construction information and the traffic congestion information can be acquired from, for example, a server of a government agency that manages traffic. The road environment information acquisition unit 41a may acquire the road environment information based on the target vehicle data acquired from the target vehicle 2.

The remaining period setting unit 41b sets the remaining period of the unstable behavior position based on the road environment information. For example, the remaining period setting unit 41b may set the remaining period of the unstable behavior position in a certain mesh from a predicted period for a change from rainy weather to sunny weather in a region including the mesh based on the weather forecast information. For example, the remaining period setting unit 41b may set the remaining period of the unstable behavior position in the mesh from a predicted end time of torrential rain in the mesh based on the weather forecast information. For example, the remaining period setting unit 41b may set the remaining period of the unstable behavior position around a construction site from an end time of road construction.

The vehicle coverage determination unit 41c determines a target vehicle coverage about the target vehicles 2. The target vehicles 2 may include a communication vehicle that can transmit information to the information processing server 40 but cannot receive information from the information processing server 40.

The vehicle coverage determination unit 41c acquires, for example, pieces of target vehicle data of the target vehicles 2 that have passed through the mesh. When the average of passing time differences of the target vehicles 2 in the mesh is equal to or larger than a passing time difference threshold, the vehicle coverage determination unit 41c determines that the target vehicle coverage in the mesh is low. When the average of the passing time differences of the target vehicles 2 in the mesh is smaller than the passing time difference threshold, the vehicle coverage determination unit 41c determines that the target vehicle coverage in the mesh is high. A median value or any other value may be used instead of the average of the passing time differences.

The vehicle coverage determination unit 41c may determine a target vehicle coverage in a region from determination results of the target vehicle coverages in the individual meshes. For example, when determination is made that the coverages in half of the meshes or more in the region are high, the vehicle coverage determination unit 41c determines that the target vehicle coverage in the region is high. The vehicle coverage determination unit 41c may directly determine the coverage of the target vehicles 2 in the region from the average of the passing time differences of the target vehicles 2 in the individual meshes in the region.

The vehicle coverage determination unit 41c may determine the coverage of the target vehicles 2 in each region by referring to information acquired from a server of a government agency or an automobile manufacturer. The vehicle coverage determination unit 41c may determine the coverage of the target vehicles 2 in the region from the ratio of the number of the target vehicles 2 to a road traffic volume in the region. For example, the vehicle coverage determination unit 41c may determine that the coverage is low when the ratio of the number of the target vehicles 2 to the road traffic volume in the region is lower than 1%. The vehicle coverage determination unit 41c may determine the coverage in consideration of the number of target vehicles 2 sold by the automobile manufacturer.

The vehicle assistant unit 41d may determine whether vehicle assistance is necessary based on the determination result from the vehicle coverage determination unit 41c. For example, when the determination result of the target vehicle coverage in the mesh toward which the target vehicle 2 is traveling shows that the coverage is low, the vehicle assistant unit 41d does not provide vehicle assistance to the target vehicle 2. For example, the vehicle assistant unit 41d may provide vehicle assistance to the target vehicle 2 only when the determination result of the target vehicle coverage in the mesh toward which the target vehicle 2 is traveling shows that the coverage is not low.

The vehicle assistant unit 41d may determine whether to execute vehicle assistance based on the determination result of the target vehicle coverage in the region instead of the mesh. For example, when any target vehicle 2 is traveling toward the mesh but the determination result of the target vehicle coverage in the region including the mesh shows that the coverage is low, the vehicle assistant unit 41d need not execute vehicle assistance for the target vehicle 2. The vehicle assistant unit 41d provides vehicle assistance to the target vehicle 2 when the determination result of the target vehicle coverage in the region including the mesh shows that the coverage is not low. As a result, the vehicle assistant unit 41d can avoid providing low-freshness vehicle assistance (for example, information provision by downlink communication) to the target vehicle 2 traveling in the low-coverage mesh or region.

The information processing server 40 may reduce unnecessary uplink communication by preventing the target vehicle data acquisition unit 11a from acquiring target vehicle data from the target vehicle 2 traveling in the low-coverage mesh or region.

Program of Second Embodiment

A program of the second embodiment causes the processor 41 of the information processing server 40 to function (operate) as the target vehicle data acquisition unit 11a, the unstable behavior position recognition unit 11b, the situation determination unit 11c, the traveling data acquisition unit 11d, the occurrence counting unit 11e, the mesh enlarging unit 11f, the road environment information acquisition unit 41a, the remaining period setting unit 41b, the storage processor 11j, the vehicle coverage determination unit 41c, and the vehicle assistant unit 41d.

Processes in Information Processing Server of Second Embodiment

Figure 16A:
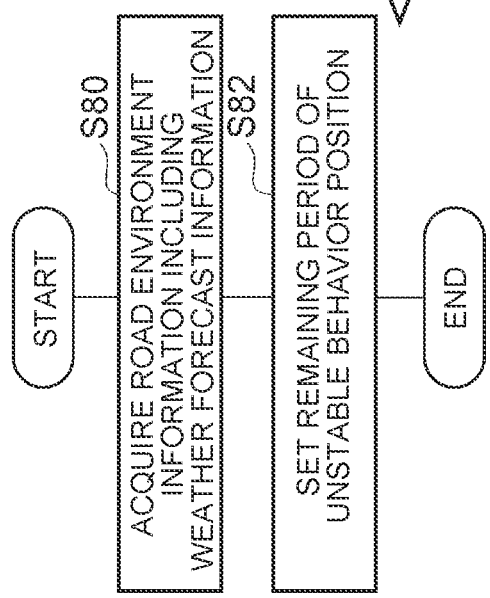
FIG. 16A is a flowchart showing an example of a remaining period setting process according to the second embodiment.

Next, processes in the information processing server according to the second embodiment will be described with reference to FIGS. 16A and 16B. FIG. 16A is a flowchart showing an example of a remaining period setting process according to the second embodiment. The remaining period setting process is executed, for example, at regular intervals.

In S80 shown in FIG. 16A, the information processing server 40 causes the road environment information acquisition unit 41a to acquire road environment information including weather forecast information (road environment information acquisition step). The road environment information acquisition unit 41a acquires the road environment information by communication.

In S82, the information processing server 40 causes the remaining period setting unit 41b to set the remaining period of the unstable behavior position (remaining period setting step). The remaining period setting unit 41b sets the remaining period of the unstable behavior position based on the road environment information. Then, the information processing server 40 terminates the current remaining period setting process.

Figure 16B:
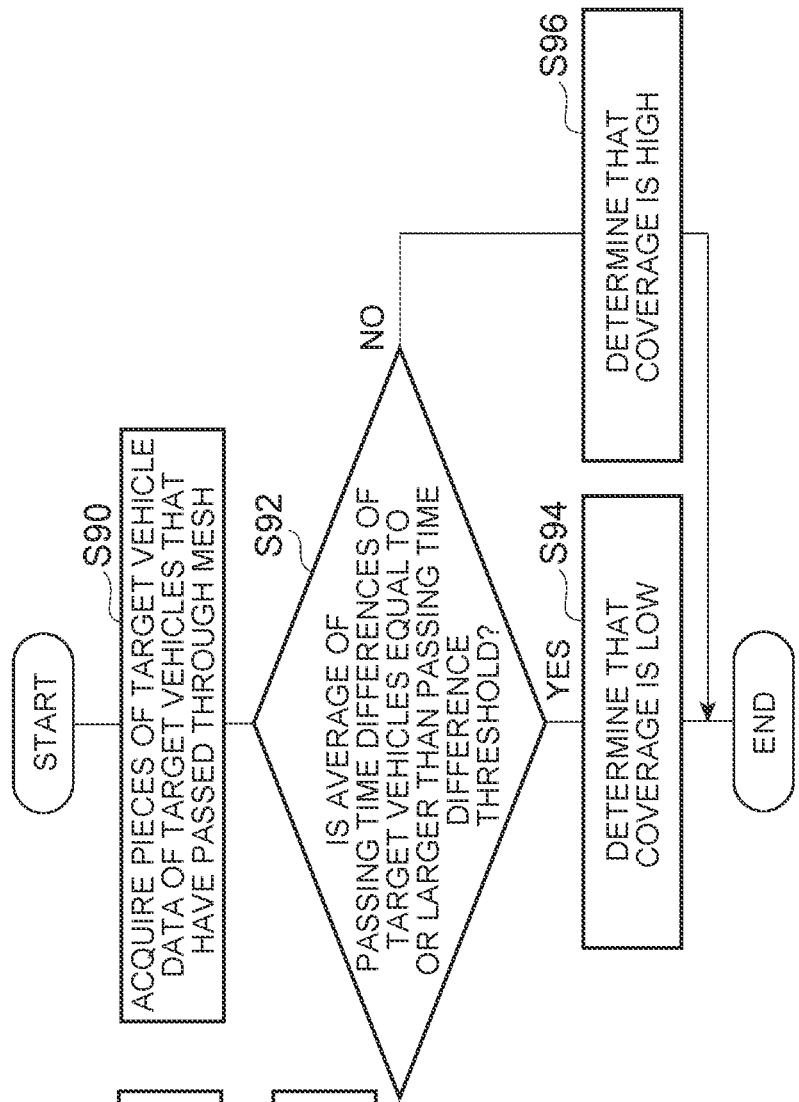
FIG. 16B is a flowchart showing an example of a vehicle coverage determination process.

FIG. 16B is a flowchart showing an example of a vehicle coverage determination process. The vehicle coverage determination process is executed, for example, at regular intervals.

In S90 shown in FIG. 16B, the information processing server 40 causes the vehicle coverage determination unit 41c to acquire pieces of target vehicle data of the target vehicles 2 that have passed through the mesh.

In S92, the information processing server 40 causes the vehicle coverage determination unit 41c to determine whether the average of passing time differences of the target vehicles 2 in the mesh is equal to or larger than the passing time difference threshold. When determination is made that the average of the passing time differences of the target vehicles 2 in the mesh is equal to or larger than the passing time difference threshold (S92: YES), the information processing server 40 proceeds to S94. When determination is not made that the average of the passing time differences of the target vehicles 2 in the mesh is equal to or larger than the passing time difference threshold (S92: NO), the information processing server 40 proceeds to S96.

In S94, the information processing server 40 determines that the coverage of the target vehicles 2 in the mesh is low. In S96, the information processing server 40 determines that the coverage of the target vehicles 2 in the mesh is high. Then, the information processing server 40 terminates the current vehicle coverage determination process.

Figure 17:
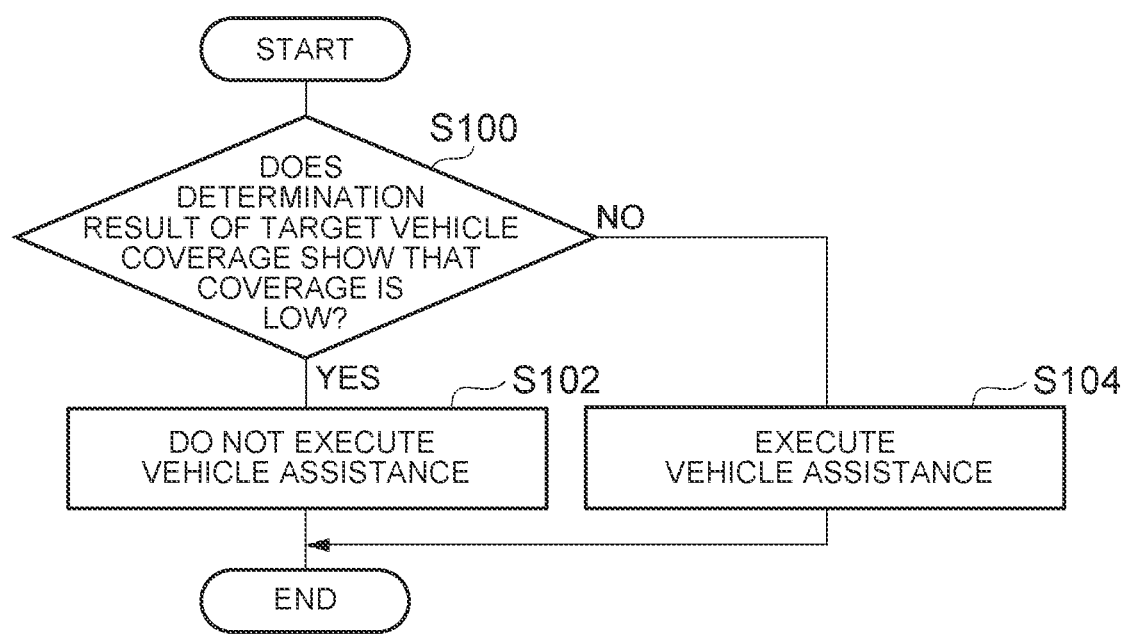
FIG. 17 is a flowchart showing an example of a vehicle assistance inexecution process.

FIG. 17 is a flowchart showing an example of a vehicle assistance inexecution process. The vehicle assistance inexecution process is executed, for example, when any target vehicle 2 is traveling toward the mesh including the unstable behavior positions in the target vehicle assistance process shown in FIG. 12B (S30: YES).

In S100 shown in FIG. 17, the information processing server 40 causes the vehicle assistant unit 41d to determine whether the determination result of the target vehicle coverage shows that the coverage is low. The vehicle assistant unit 41d makes the above determination based on the determination result of the target vehicle coverage in the mesh toward which the target vehicle 2 is traveling or the determination result of the target vehicle coverage in the region including the mesh.

When determination is made that the determination result of the target vehicle coverage shows that the coverage is low (S100: YES), the information processing server 40 proceeds to S102. When determination is not made that the determination result of the target vehicle coverage shows that the coverage is low (S100: NO), the information processing server 40 proceeds to S104.

In S102, the information processing server 40 does not cause the vehicle assistant unit 41d to execute vehicle assistance. Then, the information processing server 40 terminates the current vehicle assistance inexecution process. In S104, the information processing server 40 causes the vehicle assistant unit 41d to execute vehicle assistance. Then, the information processing server 40 terminates the current vehicle assistance inexecution process.

According to the information processing server 40 (and the processing method and the program for the information processing server 40) of the second embodiment described above, the remaining period of the unstable behavior position is set based on the road environment information, and the assistance is not provided for the unstable behavior position whose remaining period has elapsed. Thus, it is possible to reduce execution of unnecessary vehicle assistance for the unstable behavior that no longer occurs due to a change in the road environment condition. The remaining period of the unstable behavior position is set based on the weather forecast information. Thus, the remaining period can appropriately be set based on prediction of a change in weather.

According to the information processing server 40, when determination is made that the target vehicle coverage in the mesh toward which the target vehicle is traveling is low, there is a strong possibility that the freshness of the information related to the unstable behavior position in the mesh is low. It is possible to avoid vehicle assistance that is based on inappropriate information by preventing execution of the vehicle assistance.

Although the embodiments of the present disclosure have been described above, the present disclosure is not limited to the embodiments described above. The present disclosure may be carried out in various forms having various changes and improvements based on the knowledge of those skilled in the art, including the embodiments described above.

The information processing servers 10 and 40 need not set the upper limit in the mesh enlarging unit. The information processing servers 10 and 40 need not have the situation determination unit 11c. The information processing servers 10 and 40 need not determine whether the unstable behavior position is in the successive occurrence situation or in the unsuccessive occurrence situation.

The information processing servers 10 and 40 need not have the traveling data acquisition unit 11d. The acquisition of stable traveling data or unstable traveling data is not essential.

The information processing servers 10 and 40 need not have the remaining period setting unit 11h. The information processing servers 10 and 40 need not set the remaining period for each unstable behavior position. The information processing servers 10 and 40 may delete the unstable behavior position after a predetermined period has elapsed from the recognition or the storage in the storage database 16.

The information processing server 40 according to the second embodiment may have either one of the road environment information acquisition unit 41a and the vehicle coverage determination unit 41c, and need not have both of them.

What is claimed is:

1. An information processing server comprising:
   a target vehicle data acquisition unit configured to acquire target vehicle data having traveling conditions of target vehicles and position information of the target vehicles on a map;
   an unstable behavior position recognition unit configured to recognize, based on the target vehicle data, an unstable behavior position on the map where at least one of the target vehicles exhibits unstable behavior;
   an occurrence counting unit configured to measure an occurrence count of unstable behavior positions within a predetermined period in a mesh preset on the map;
   a mesh enlarging unit configured to enlarge the mesh to include the unstable behavior positions within the predetermined period such that the occurrence count of the unstable behavior positions is equal to or larger than a first threshold;
   a storage processor configured to store the mesh and the unstable behavior positions of the mesh in a storage database related each other;
   a vehicle assistant unit configured to, when one of the target vehicles is traveling toward the mesh including the unstable behavior positions, provide vehicle assistance related to the unstable behavior positions in the mesh for the target vehicle, wherein
   the vehicle assistant unit is configured to change a vehicle assistance content depending on a size of the mesh.

2. The information processing server according to claim 1, wherein the mesh enlarging unit is configured to terminate enlargement of the mesh when the mesh is enlarged to a predetermined upper limit while the occurrence count of the included unstable behavior positions within the predetermined period is not equal to or larger than the first threshold.

3. The information processing server according to claim 1, wherein the mesh enlarging unit is configured to:
   measure the number of occurrences of an intermittent operation corresponding to unstable behaviors of the same target vehicle during the same trip in the mesh based on the target vehicle data, the unstable behavior positions, and the mesh; and
   divide, into a plurality of parts, the mesh where the number of occurrences of the intermittent operation is equal to or larger than an intermittent operation count threshold and a distance between the unstable behaviors in the intermittent operation of the same target vehicle is equal to or longer than a predetermined distance.

4. The information processing server according to claim 1, further comprising:
   a reproduction frequency measuring unit configured to measure a reproduction frequency of the unstable behavior in a reproduction frequency measurement area based on the unstable behavior positions associated with the mesh and the reproduction frequency measurement area including at least one mesh;
   a remaining period setting unit configured to set a remaining period of each of the unstable behavior positions in the reproduction frequency measurement area based on the reproduction frequency of the unstable behavior in the reproduction frequency measurement area; and, wherein
   the vehicle assistant unit is configured not to provide, for the target vehicle, the vehicle assistance related to the unstable behavior position in which the remaining period elapses among the unstable behavior positions in the reproduction frequency measurement area.

5. The information processing server according to claim 1, further comprising:
   a road environment information acquiring unit configured to acquire road environment information associated with the map; and a remaining period setting unit configured to set a remaining period of each of the unstable behavior positions based on the road environment information, wherein the vehicle assistant unit is configured not to provide, for the target vehicle, the vehicle assistance related to the unstable behavior position in which the remaining period elapses among the unstable behavior positions of the mesh.

6. The information processing server according to claim 5, wherein the road environment information acquiring unit is configured to acquire weather forecast information associated with the mesh as the road environment information.

7. The information processing server according to claim 1, further comprising:
a vehicle coverage determination unit configured to determine whether a target vehicle coverage in the mesh is low based on the target vehicle data of the target vehicles passing through the mesh; wherein
the vehicle assistant unit is configured not to provide the vehicle assistance for the target vehicle when the vehicle coverage determination unit determines that the target vehicle coverage in the mesh is low, the target vehicle traveling toward the mesh.

8. The information processing server according to claim 1, further comprising a situation determination unit configured to, based on whether a plurality of the target vehicles exhibits the unstable behavior at each of the unstable behavior positions, determine whether the unstable behavior position is in a successive occurrence situation or an unsuccessive occurrence situation, the successive occurrence situation being a situation in which the unstable behavior has occurred successively, the unsuccessive occurrence situation being a situation in which the unstable behavior has not occurred successively, wherein
the mesh enlarging unit is configured to enlarge the mesh as the occurrence count of the unstable behavior positions by using a determination count of the successive occurrence situations of the unstable behavior positions within the predetermined period.

9. A processing method for an information processing server, comprising:
a target vehicle data acquisition step for acquiring target vehicle data having traveling conditions of target vehicles and position information of the target vehicles on a map;
an unstable behavior position recognition step for recognizing, based on the target vehicle data, an unstable behavior position on the map where at least one of the target vehicles exhibits unstable behavior;
an occurrence count measuring step for measuring an occurrence count of unstable behavior positions within a predetermined period in a mesh preset on the map;
a mesh enlargement step for enlarging the mesh to include the unstable behavior positions within the predetermined period such that the occurrence count of the unstable behavior positions is equal to or larger than a first threshold;
a storage process step for storing the mesh and the unstable behavior positions in the mesh of a storage database related to each other; and
a vehicle assistant step for providing vehicle assistance related to the unstable behavior positions in the mesh for the target vehicle when one of the target vehicles is traveling tow and the mesh including the unstable behavior positions, wherein
a vehicle assistance content changes depending on a size of the mesh.

10. A non-transitory storage medium storing instructions that are executable by one or more processors and that cause the one or more processors to perform functions comprising:
acquiring target vehicle data having traveling conditions of target vehicles and position information of the target vehicles on a map;
recognizing, based on the target vehicle data, an unstable behavior position on the map where at least one of the target vehicles exhibits unstable behavior;
measuring an occurrence count of unstable behavior positions within a predetermined period in a mesh preset on the map;
enlarging the mesh to include the unstable behavior positions within the predetermined period such that the occurrence count of the unstable behavior positions is equal to or larger than a first threshold;
storing the mesh and the unstable behavior positions of the mesh in a storage database related to each other; and
providing vehicle assistance related to the unstable behavior positions in the mesh for the target vehicle when one of the target vehicles is traveling toward the mesh including the unstable behavior positions, wherein
a vehicle assistance content changes depending on a size of the mesh.

* * * * *